(12) United States Patent
Murakawa

(10) Patent No.: US 10,657,309 B2
(45) Date of Patent: May 19, 2020

(54) INFORMATION PROCESSING APPARATUS CAPABLE OF CORRECTING A WRITTEN OBJECT ON THE BASIS OF A DETECTED REFERENCE DIRECTION

(71) Applicant: Konica Minolta, Inc., Chiyoda-ku, Tokyo (JP)

(72) Inventor: Akira Murakawa, Toyonaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/601,359

(22) Filed: May 22, 2017

(65) Prior Publication Data

US 2017/0344517 A1 Nov. 30, 2017

(30) Foreign Application Priority Data

May 26, 2016 (JP) .................................. 2016-104833

(51) Int. Cl.
| | | |
|---|---|---|
| *G06F 40/106* | (2020.01) | |
| *H04N 1/62* | (2006.01) | |
| *G06F 40/169* | (2020.01) | |
| *G06K 9/00* | (2006.01) | |
| *G06K 9/32* | (2006.01) | |
| *H04N 1/387* | (2006.01) | |

(52) U.S. Cl.
CPC .......... *G06F 40/106* (2020.01); *G06F 40/169* (2020.01); *G06K 9/00463* (2013.01); *G06K 9/3208* (2013.01); *G06K 9/3283* (2013.01); *H04N 1/3878* (2013.01); *H04N 1/626* (2013.01)

(58) Field of Classification Search
CPC . G06F 17/212; G06F 17/241; G06K 9/00463; G06K 9/3208; G06K 9/3283; H04N 1/3878; H04N 1/626
USPC ................. 715/232, 243, 244, 245, 246, 247
See application file for complete search history.

(56) References Cited

U.S. PATENT DOCUMENTS

| | | | | |
|---|---|---|---|---|
| 5,191,438 A | * | 3/1993 | Katsurada | ............ G06K 9/3283 358/488 |
| 5,506,918 A | * | 4/1996 | Ishitani | ................ G06K 9/3283 382/173 |
| 6,256,009 B1 | * | 7/2001 | Lui | ........................ G06F 3/0485 178/18.03 |
| 6,771,842 B1 | * | 8/2004 | Sakai | ...................... G06T 3/608 358/488 |

(Continued)

FOREIGN PATENT DOCUMENTS

JP          2005-010886 A    1/2005

*Primary Examiner* — Andrew R Dyer

(74) *Attorney, Agent, or Firm* — Buchanan Ingersoll & Rooney PC

(57) ABSTRACT

An information processing apparatus capable of displaying an image on a predetermined display unit, includes: a reception unit that receives a written input on an image according to an operation of a user in a state where the image is displayed on the display unit; a generation unit that generates a written object according to the written input received by the reception unit; a reference detection unit that detects a reference direction of the image displayed on the display unit; a correction unit that corrects the written object on the basis of the reference direction detected by the reference detection unit; and a display control unit that displays the written object generated by the generation unit.

28 Claims, 23 Drawing Sheets

(56) References Cited

U.S. PATENT DOCUMENTS

| | | | | |
|---|---|---|---|---|
| 7,120,872 B2* | 10/2006 | Thacker | G06F 3/0481 | 715/209 |
| 7,679,625 B1* | 3/2010 | Fagans | G06T 3/608 | 345/620 |
| 8,543,911 B2* | 9/2013 | Mansfield | G06F 17/212 | 715/243 |
| 8,549,399 B2* | 10/2013 | Mansfield | G06F 17/212 | 345/642 |
| 2002/0064308 A1* | 5/2002 | Altman | G06K 9/00442 | 382/187 |
| 2003/0071850 A1* | 4/2003 | Geidl | G06F 3/0481 | 715/781 |
| 2003/0215139 A1* | 11/2003 | Shilman | G06K 9/00409 | 382/186 |
| 2003/0215157 A1* | 11/2003 | Chao | G06K 9/3283 | 382/294 |
| 2004/0013318 A1* | 1/2004 | Simske | G06K 9/3283 | 382/289 |
| 2004/0021700 A1* | 2/2004 | Iwema | G06K 9/00436 | 715/863 |
| 2004/0136083 A1* | 7/2004 | Wang | G06F 3/0317 | 359/642 |
| 2004/0165774 A1* | 8/2004 | Koubaroulis | G06K 9/00409 | 382/179 |
| 2004/0240737 A1* | 12/2004 | Lim | G06K 9/325 | 382/182 |
| 2005/0089225 A1* | 4/2005 | Chang | G06K 9/00375 | 382/181 |
| 2006/0085740 A1* | 4/2006 | Ye | G06F 17/242 | 715/230 |
| 2008/0292190 A1* | 11/2008 | Biswas | G06K 9/00402 | 382/187 |
| 2012/0212423 A1* | 8/2012 | Dondurur | G06F 3/04883 | 345/173 |
| 2013/0016122 A1* | 1/2013 | Bhatt | G06F 3/04845 | 345/620 |
| 2014/0245137 A1* | 8/2014 | Kim | G06F 17/241 | 715/268 |
| 2015/0009520 A1* | 1/2015 | Yamada | H04N 1/387 | 358/1.14 |
| 2015/0026569 A1* | 1/2015 | Lee | G06F 3/016 | 715/256 |
| 2015/0277586 A1* | 10/2015 | Trenholm-Boyle | G06F 3/0383 | 345/157 |
| 2017/0153806 A1* | 6/2017 | Rucine | G06F 3/017 | |

* cited by examiner

REFERENCE 1 IN PAGE 130 ...

FIG. 12A
REFERENCE 1 IN PAGE 130 STATES THAT
ACCORDING TO RECENT DATA,
WASTE SECTION-DERIVED GREENHOUSE
FIG. 12B
FIG. 12C
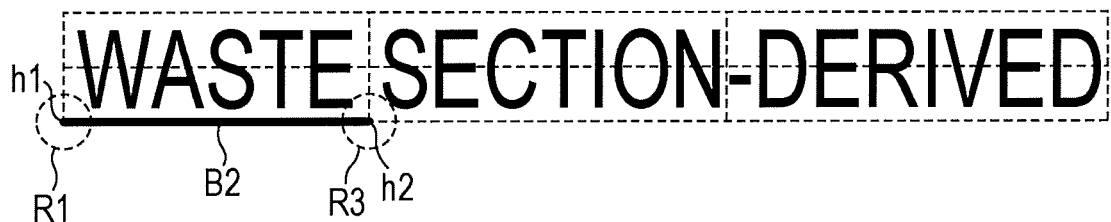

INFORMATION PROCESSING APPARATUS CAPABLE OF CORRECTING A WRITTEN OBJECT ON THE BASIS OF A DETECTED REFERENCE DIRECTION

The entire disclosure of Japanese Patent Application No. 2016-104833 filed on May 26, 2016 including description, claims, drawings, and abstract are incorporated herein by reference in its entirety.

BACKGROUND OF THE INVENTION

Field of the Invention

The present invention relates to an information processing apparatus and a program, and particularly, to a technique of correcting an image input by a user.

Description of the Related Art

Conventionally, an information processing apparatus can acquire image data from other devices and display the image data on a display unit such as a display. The image data acquired by the information processing apparatus includes image data generated by performing a scan process, for example. Furthermore, in recent years, an information processing apparatus capable of writing figures such as characters, symbols, underlines, or the like on a displayed image according to an operation of an operating unit such as a mouse, of a user in a state where the image is displayed on a display unit has been provided. According to such an information processing apparatus, a user can add underlines, surrounding frames, or the like to a character string or the like displayed on a display unit by operating an operating unit.

When a written input is added according to an operation of a user, an object may be written at a position that is shifted from an appropriate position in relation to a character string, at which the user wants to write. Moreover, when a document image is automatically read by scanning, a readout head read the image while moving a reading position of the document in a main-scanning direction in a sub-scanning direction orthogonal to the main-scanning direction. In such a reading method, even when the readout head performs a reading operation in the main-scanning direction, the reading position of the readout head moves in the sub-scanning direction and an inclined image is sometimes obtained by the scan. Furthermore, when a document is conveyed in an oblique state in relation to a document reading direction until the document is conveyed to a document reading unit or when a document is mounted on a document mounting unit in an oblique state in relation to a document reading direction, an image or a character may be displayed on a display unit in an inclined state, for example. In such a case, a user adds a written input on an image or a character string displayed on the display unit in an inclined state. Therefore, it is difficult to add a written input to an appropriate position to display the written object as compared to when the image or the character is not inclined.

Therefore, an image processing apparatus that detects an inclination of a character image and corrects the character image in a scanning direction, for example, is proposed (for example, JP 2005-10886 A). According to such an image processing apparatus, it is possible to correct an image or a character string in the scanning direction when the image or the character string is displayed on a display unit in an inclined state.

However, the image processing apparatus disclosed in JP 2005-10886 A has a problem that it is difficult to correct an object written by a user so as to be displayed at an appropriate position in relation to an image or a character string displayed on a display unit. This is because, as described above, in the case of image data generated by a scan process, since an image or a character string is often inclined, even when the object is corrected in a scanning direction, the object is displayed at a position that is not related to the arrangement of the image or the character string. Therefore, it is not possible to display the object at an appropriate position.

SUMMARY OF THE INVENTION

The present invention has been made in order to solve the above problem, and an object thereof is to provide an information processing apparatus and a program capable of displaying an object written on an image or a character displayed on a display unit at an appropriate position according to an operation of a user.

To achieve the abovementioned object, according to an aspect, an information processing apparatus capable of displaying an image on a predetermined display unit, reflecting one aspect of the present invention comprises: a reception unit that receives a written input on an image according to an operation of a user in a state where the image is displayed on the display unit; a generation unit that generates a written object according to the written input received by the reception unit; a reference detection unit that detects a reference direction of the image displayed on the display unit; a correction unit that corrects the written object on the basis of the reference direction detected by the reference detection unit; and a display control unit that displays the written object generated by the generation unit.

According to an invention of Item. 2, in the information processing apparatus of Item. 1, the information processing apparatus preferably further comprises: a character string detection unit that detects a character string included in the image, wherein the reference detection unit preferably detects the reference direction on the basis of an arrangement direction of the character string detected by the character string detection unit.

According to an invention of Item. 3, in the information processing apparatus of Item. 2, the information processing apparatus preferably further comprises: an inclination detection unit that detects an inclination direction of the written object added to the image, wherein the correction unit preferably corrects the inclination direction detected by the inclination detection unit to the reference direction.

According to an invention of Item. 4, in the information processing apparatus of Item. 3, the correction unit preferably corrects the inclination direction when a difference between an angle of the inclination direction detected by the inclination detection unit and an angle of the reference direction is within a predetermined range.

According to an invention of Item. 5, in the information processing apparatus of Item. 4, the predetermined range is preferably set in advance by the user.

According to an invention of Item. 6, in the information processing apparatus of any one of Items. 3 to 5, the correction unit preferably does not correct the inclination direction when a difference between an angle of the inclination direction detected by the inclination detection unit and an angle of the reference direction is outside a predetermined range.

According to an invention of Item. 7, in the information processing apparatus of any one of Items. 3 to 6, the written object preferably includes a linear object made up of lines which are written-input according to the operation of the user, and in a case where the written object is the linear object, the correction unit preferably corrects the inclination direction when a length of the linear object in the reference direction is equal to or larger than a predetermined value and a difference between the angle of the inclination direction and the angle of the reference direction is within the first range, and the correction unit preferably corrects the inclination direction when the length of the linear object in the reference direction is smaller than the predetermined value and the difference between the angle of the inclination direction and the angle of the reference direction is within a second range that includes the first range.

According to an invention of Item. 8, in the information processing apparatus of any one of Items. 2 to 7, the information processing apparatus preferably further comprises: a determination unit that determines a type of the written object, wherein the correction unit preferably corrects the written object according to the type of the written object determined by the determination unit.

According to an invention of Item. 9, in the information processing apparatus of Item. 8, the determination unit preferably determines whether the written object is a predetermined object added to the character string on the basis of a position of the written object in relation to the character string included in the image, and the correction unit preferably arranges the written object at a position set in advance for the character string when the determination unit determines that the written object is the predetermined object.

According to an invention of Item. 10, in the information processing apparatus of any one of Items. 3 to 9, the information processing apparatus preferably further comprises: a break detection unit that analyzes the character string detected by the character string detection unit to detect a predetermined break position in the character string, wherein the correction unit preferably aligns the end point so as to match the break position when the end point of the written object is within a predetermined range that includes the break position.

According to an invention of Item. 11, in the information processing apparatus of Item. 10, the break detection unit preferably detects a break position of a word in the character string, and the correction unit preferably aligns the end point so as to match the break position of the word when the end point of the written object is within a predetermined range that includes the break position of the word detected by the break detection unit.

According to an invention of Item. 12, in the information processing apparatus of any one of Items. 3 to 11, when the written object has two end points, the correction unit preferably corrects the written object to a segment that connects the two end points.

According to an invention of Item. 13, in the information processing apparatus of Item. 12, the correction unit preferably corrects the written object to the segment when the written object is within a predetermined range that includes the segment that connects the two end points.

According to an invention of Item. 14, in the information processing apparatus of any one of Items. 2 to 13, the image is preferably disposed in a page that forms a document, and the information processing apparatus preferably further comprises: an image correction unit that corrects the image that includes the character string detected by the character string detection unit so as to be parallel to one edge of the page.

According to an invention of Item. 15, in the information processing apparatus of any one of Items. 1 to 14, when an image is included in a document that includes a plurality of pages, the reference detection unit preferably detects the reference direction of each page on the basis of the image included in each page.

According to an invention of Item. 16, in the information processing apparatus of any one of Items. 1 to 15, the image is preferably generated by a scan function.

To achieve the abovementioned object, according to an aspect, there is provided a non-transitory recording medium storing a computer readable program executed in a computer of an information processing apparatus capable of displaying an image on a predetermined display unit, and the program reflecting one aspect of the present invention causes the computer to execute the steps of: receiving a written input on an image according to an operation of a user in a state where the image is displayed on the display unit; generating a written object according to the received written input; detecting a reference direction of the image displayed on the display unit; correcting the written object on the basis of the detected reference direction; and displaying the generated written object.

According to an invention of Item. 18, in the non-transitory recording medium storing a computer readable program of Item. 17, the program preferably further causes the computer to execute a step of detecting a character string included in the image, and in the step of detecting the reference direction, the reference direction is preferably detected on the basis of an arrangement direction of the detected character string.

According to an invention of Item. 19, in the non-transitory recording medium storing a computer readable program of Item. 18, the program preferably further causes the computer to execute a step of detecting an inclination direction of the written object added to the image, and in the correcting step, the detected inclination direction is preferably corrected to the reference direction.

According to an invention of Item. 20, in the non-transitory recording medium storing a computer readable program of Item. 19, in the correcting step, the inclination direction is preferably corrected when a difference between an angle of the detected inclination direction and an angle of the reference direction is within a predetermined range.

According to an invention of Item. 21, in the non-transitory recording medium storing a computer readable program of Item. 20, the predetermined range is preferably set in advance by the user.

According to an invention of Item. 22, in the non-transitory recording medium storing a computer readable program of any one of Items. 19 to 21, in the correcting step, the inclination direction is not preferably corrected when a difference between an angle of the detected inclination direction and an angle of the reference direction is outside a predetermined range.

According to an invention of Item. 23, in the non-transitory recording medium storing a computer readable program of any one of Items. 19 to 22, the written object preferably includes a linear object made up of lines which are written-input according to the operation of the user, and in the correcting step, in a case where the written object is the linear object, the inclination direction is preferably corrected when a length of the linear object in the reference direction is equal to or larger than a predetermined value and a difference between the angle of the inclination direction and the angle of the reference direction is within the first range, and the inclination direction is preferably corrected when the length of the linear object in the reference direction is smaller than the predetermined value and the difference between the angle of the inclination direction and the angle of the reference direction is within a second range that includes the first range.

According to an invention of Item. 24, in the non-transitory recording medium storing a computer readable program of any one of Items. 18 to 23, the program preferably further causes the computer to execute a step of determining a type of the written object, and in the correcting step, the written object is preferably corrected according to the determined type of the written object.

According to an invention of Item. 25, in the non-transitory recording medium storing a computer readable program of Item. 24, in the determining step, whether the written object is a predetermined object added to the character string is preferably determined on the basis of a position of the written object in relation to the character string included in the image, and in the correcting step, the written object is preferably arranged at a position set in advance for the character string when it is determined that the written object is the predetermined object.

According to an invention of Item. 26, in the non-transitory recording medium storing a computer readable program of any one of Items. 19 to 25, the program preferably further causes the computer to execute a step of analyzing the detected character string to detect a predetermined break position in the character string, and in the correcting step, the end point is preferably aligned so as to match the break position when the end point of the written object is within a predetermined range that includes the break position.

According to an invention of Item. 27, in the non-transitory recording medium storing a computer readable program of Item. 26, in the step of detecting the break position, a break position of a word in the character string is preferably detected, and in the correcting step, the end point is preferably aligned so as to match the break position of the word when the end point of the written object is within a predetermined range that includes the detected break position of the word.

According to an invention of Item. 28, in the non-transitory recording medium storing a computer readable program of any one of Items. 19 to 27, in the correcting step, when the written object has two end points, the written object is preferably corrected to a segment that connects the two end points.

According to an invention of Item. 29, in the non-transitory recording medium storing a computer readable program of Item. 28, in the correcting step, the written object is preferably corrected to the segment when the written object is within a predetermined range that includes the segment that connects the two end points.

According to an invention of Item. 30, in the non-transitory recording medium storing a computer readable program of any one of Items. 18 to 29, the image is preferably disposed in a page that forms a document, and the program preferably further causes the computer to execute a step of correcting the image that includes the detected character string so as to be parallel to one edge of the page.

According to an invention of Item. 31, in the non-transitory recording medium storing a computer readable program of any one of Items. 17 to 30, in the step of detecting the reference direction, when an image is included in a document that includes a plurality of pages, the reference direction of each page is preferably detected on the basis of the image included in each page.

According to an invention of Item. 32, in the non-transitory recording medium storing a computer readable program of any one of Items. 17 to 31, the image is preferably generated by a scan function.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 12A to 12C are diagrams illustrating an example when a written object is corrected according to a break in a character string;

DESCRIPTION OF THE PREFERRED EMBODIMENTS

Figure 1:
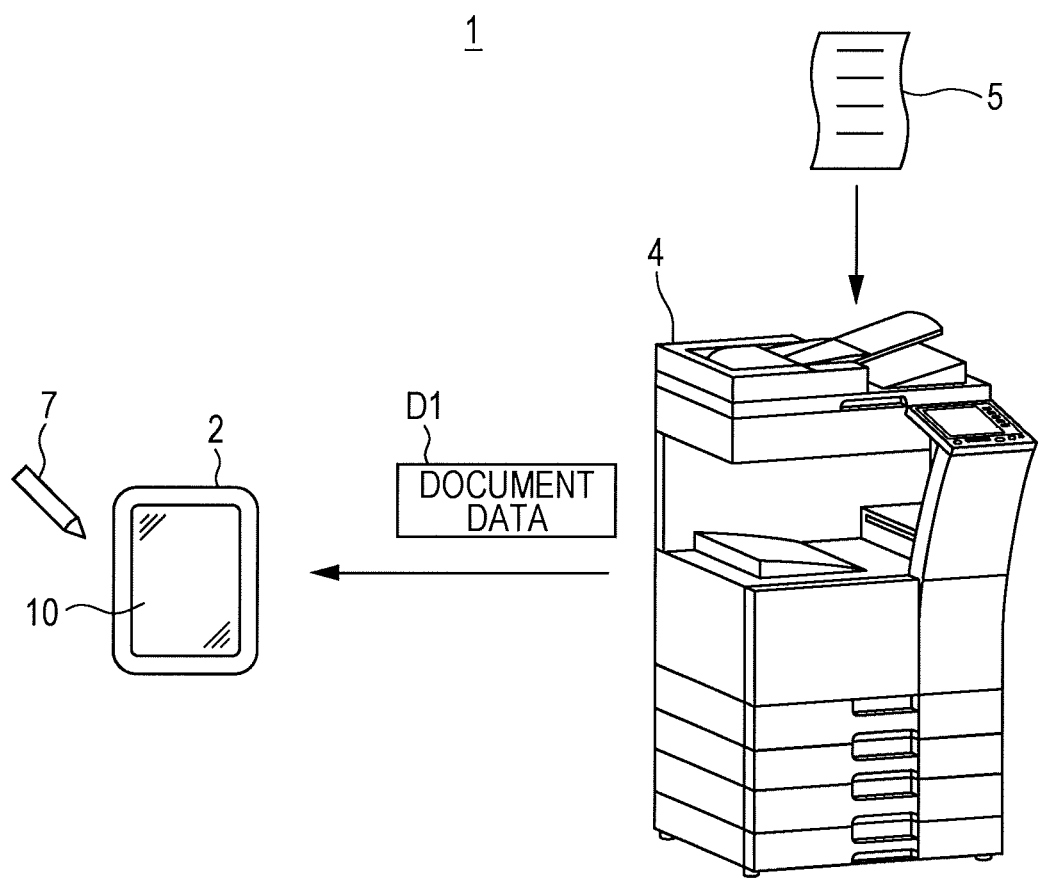
FIG. 1 is a diagram illustrating an entire configuration of an information processing system that includes an information processing apparatus.

Hereinafter, preferred embodiments of the present invention will be described in detail with reference to the drawings. However, the scope of the invention is not limited to the illustrated examples. In the embodiments to be described later, the same components are denoted by the same reference numerals, and redundant description thereof will not be provided.

FIG. 1 is a diagram illustrating a configuration example of an information processing system 1 which is an embodiment of the present invention. This information processing system 1 includes an information processing apparatus 2 configured as a smartphone, a tablet terminal, a personal computer (PC), or the like and an image processing apparatus 4 that can communicate with the information processing apparatus 2. The image processing apparatus 4 is configured as an MFP (Multifunction Peripheral) or the like and is an apparatus capable of executing scan jobs created according to an instruction operation of a user. Instead of this, the image processing apparatus 4 may be an apparatus that includes a scan function only. The information processing apparatus 2 has a function of performing radio communication using radio waves such as Bluetooth (registered trademark), Wi-Fi, or the like and can perform radio communication with the image processing apparatus 4. Moreover, the information processing apparatus 2 and the image processing apparatus 4 can communicate with each other via a network such as LAN (Local Area Network) or the Internet which is not illustrated.

Figure 2A:
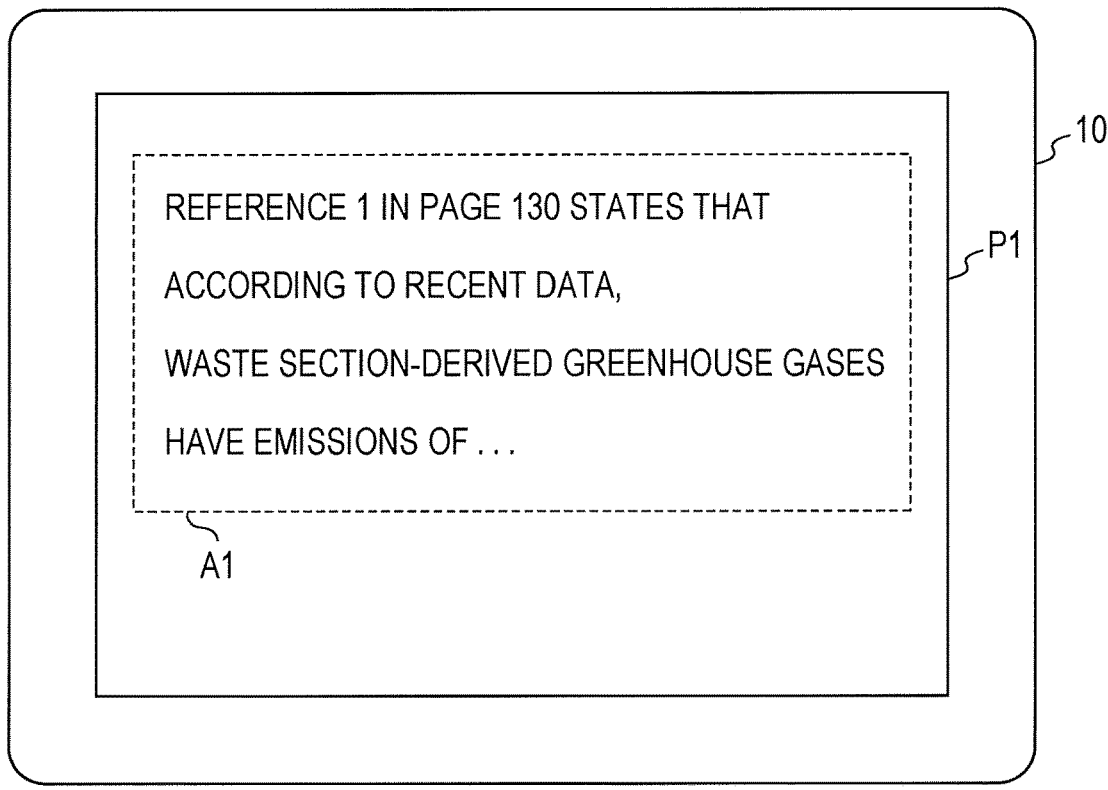
FIGS. 2A and 2B are diagrams illustrating a display example of an image based on document data.
Figure 2B:
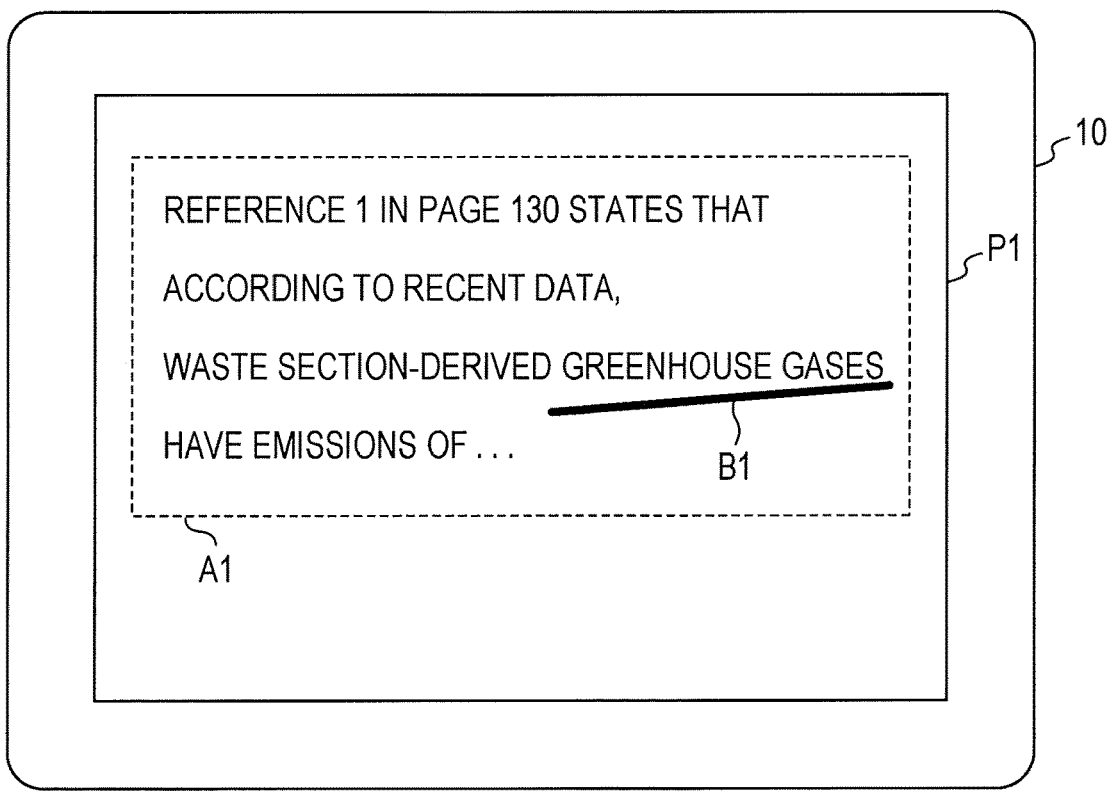

The image processing apparatus 4 performs a scan process on a document 5 to generate document data D1. The document data D1 is image data having the format of bitmap, JPEG, or the like, for example. Instead of this, the document data D1 may be data which is not generated by a scan process but generated by a document editing application or the like, for example, and may include text data. The information processing apparatus 2 can acquire the document data D1 from the image processing apparatus 4 via radio communication or a network. The information processing apparatus 2 includes a display unit 10 and can display an image on the display unit 10 on the basis of the document data D1. FIGS. 2A and 2B are diagrams illustrating an example of a screen configuration when an image is displayed on the basis of the document data D1. As illustrated in FIG. 2A, a page P1 that forms the document data D1 is displayed in the display unit 10, and an image A1 is displayed in the page P1. The document data D1 may include a plurality of pages P1. In this case, the information processing apparatus 2 can display one page P1 in the display unit 10 and can display a plurality of pages P1 side by side.

The image A1 may be displayed in parallel to an upper edge and a lower edge of the page P1 as illustrated in FIG. 2A. In some cases, the image A1 may be displayed to be inclined in relation to the upper edge and the lower edge of the page P1. Moreover, when the document data D1 includes a plurality of pages P1, the presence or the degree of an inclination of the image A1 may differ from page P1 to page P1.

FIG. 2B is a diagram illustrating an example when the image A1 is displayed on the display unit 10 and an object is added to the image A1. When the image A1 is displayed on the display unit 10, a user can add a written object B1 by operating an operating unit 11. The operating unit 11 is configured as a mouse or the like, for example, or may be configured as a touch sensor or the like disposed on the screen of the display unit 10. The written object B1 is displayed on the display unit 10 in a shape corresponding to the operation of the user. In the example of FIG. 2B, an underline is added to a character string of the image A1 so that the user can easily find words that are to be emphasized.

As described above, when the written object B1 having a shape corresponding to an operation of the user is added, the added written object B1 may not be displayed as a straight line and may be inclined in relation to an arrangement direction of the character string, or may not be displayed at an appropriate position of the character string, at which the user wants to add the written object B1. Therefore, the information processing apparatus 2 of the present embodiment is an apparatus capable of correcting the written object B1 so as to be added on the basis of the arrangement direction of the character string in the image A1. Hereinafter, a specific configuration of the information processing apparatus 2 will be described.

Figure 3:
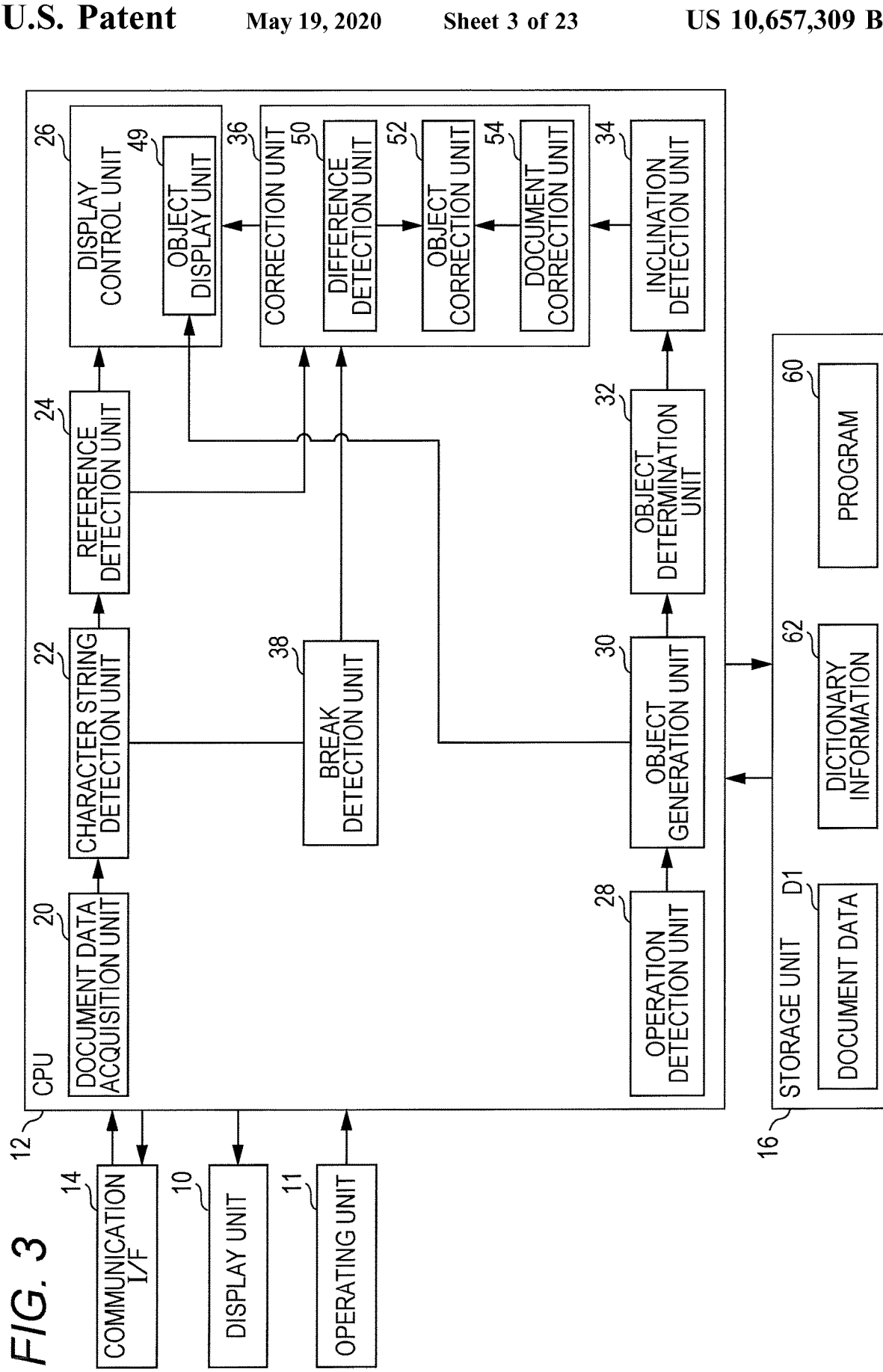
FIG. 3 is a block diagram illustrating an example of a hardware configuration and a functional configuration of an information processing apparatus.

FIG. 3 is a block diagram illustrating an example of a functional configuration and a hardware configuration of the information processing apparatus 2. The information processing apparatus 2 includes a communication interface 14 serving as an interface for communication with the image processing apparatus 4, a CPU 12, and a storage unit 16.

The storage unit 16 is a nonvolatile storage unit. A program 60 executed by the information processing apparatus 2 to cause the CPU 12 to function as processing units to be described later is stored in this storage unit 16. The document data D1 acquired from the image processing apparatus 4 is also stored in the storage unit 16.

The CPU 12 reads and executes the program 60 to function as a document data acquisition unit 20, a character string detection unit 22, a reference detection unit 24, a display control unit 26, an operation detection unit 28, an object generation unit 30, an object determination unit 32, an inclination detection unit 34, a correction unit 36, and a break detection unit 38. The display control unit 26 also functions as an object display unit 49. The correction unit 36 also functions as a difference detection unit 50, an object correction unit 52, and a document correction unit 54.

Figures 4A, 4B:
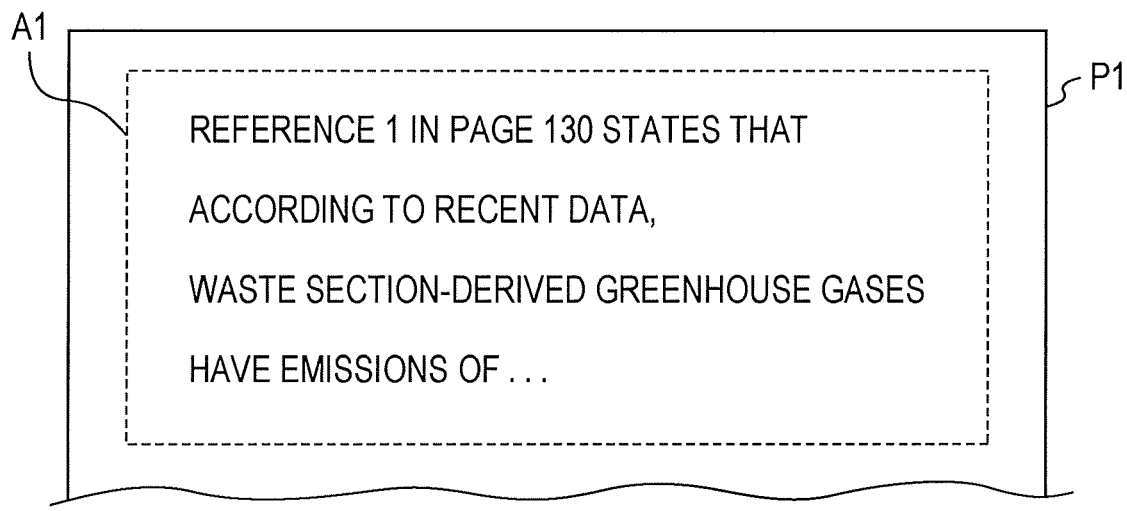
FIGS. 4A and 4B are diagrams illustrating an example when an image is included in a character string.

The document data acquisition unit 20 is a processing unit that acquires the document data D1 when the information processing apparatus 2 receives the document data D1 from the image processing apparatus 4 via the communication interface 14. The character string detection unit 22 is activated when the document data D1 is acquired by the document data acquisition unit 20. The character string detection unit 22 is a processing unit that detects a character string from an image included in the document data D1. FIGS. 4A and 4B are diagrams illustrating an example of an aspect of display of the image A1 displayed on the display unit 10 when the document data D1 is acquired. When the document data D1 is acquired by the document data acquisition unit 20, the page P1 of the document data D1 is displayed on the display unit 10 as illustrated in FIG. 4A. Moreover, the character string included in the page P1 is detected by the character string detection unit 22. When the character string is detected by the character string detection unit 22, the reference detection unit 24 (see FIG. 3) is activated to detect an arrangement direction of the character string detected by the character string detection unit 22.

FIG. 4B is a diagram illustrating an example of an arrangement direction of the character string detected by the reference detection unit 24. When the character string included in the page P1 is detected by the character string detection unit 22, the reference detection unit 24 detects an arrangement direction of the character string on the basis of the arrangement of characters that forms the character string. In the example illustrated in FIGS. 4A and 4B, the characters are arranged approximately in parallel to the upper and lower edges of the page P1, and the arrangement direction of the character string is a reference direction F1 as illustrated in FIG. 4B.

The reference detection unit 24 is a processing unit that detects the reference direction F1 of the image A1. In the present embodiment, the reference direction F1 is a direction used as a reference when correcting the written object B1 added to the image A1. When the written object B1 is inclined in relation to the reference direction F1, the correction unit 36 to be described later rotates the written object B1 so as to match the reference direction F1, for example. In the present embodiment, the reference detection unit 24 determines the detected arrangement direction as the reference direction F1 of the image A1 when the arrangement direction of the character string is detected. In this way, since the written object B1 is corrected so as to match the arrangement direction of the character string included in the image A1 by the correction unit 36 to be described later, the written object B1 is appropriately added to the character string.

The operation detection unit 28 is a processing unit that receives a written input on the image A1 according to an operation of a user when the user performs an operation on the operating unit 11 in a state where the image A1 is displayed on the display unit 10. In the present embodiment, the operation detection unit 28 receives the written input when an instruction to start reception of the written input is detected. Moreover, the operation detection unit 28 ends reception of the written input when an instruction to end reception of the written input is detected.

The object generation unit 30 is activated when the written input is received by the operation detection unit 28. The object generation unit 30 is a processing unit that generates the written object B1 according to the written input received by the operation detection unit 28. The object generation unit 30 generates the written object B1 on the basis of the written input received by the operation detection unit 28 and adds the generated written object B1 to the image A1. In the present embodiment, when the written object B1 is generated by the object generation unit 30, the display control unit 26 displays the written object B1 on the display unit 10.

Figure 5A:
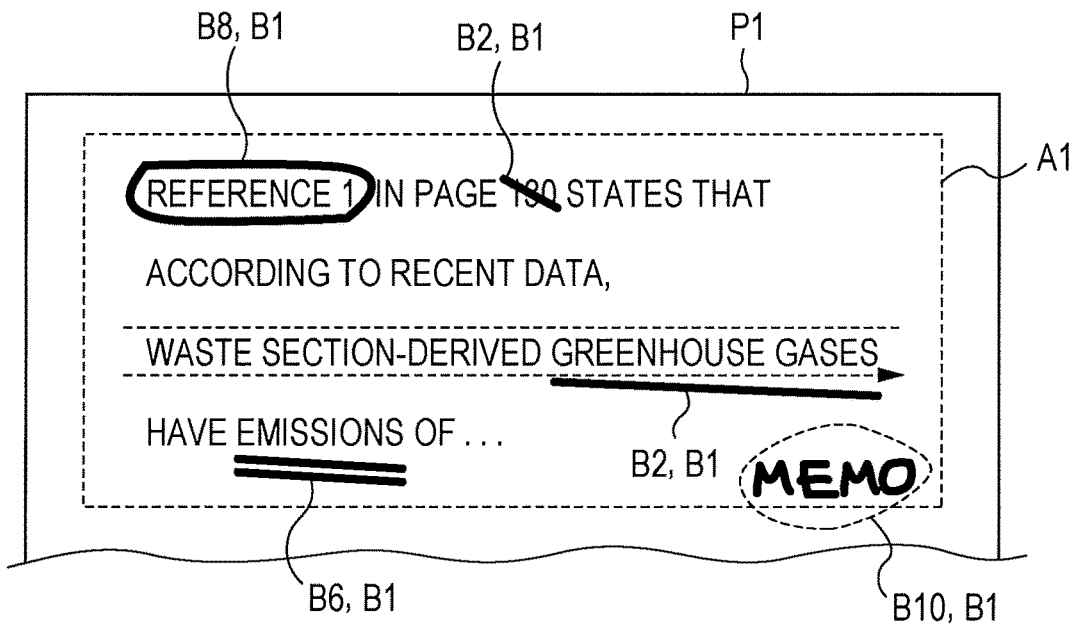
FIGS. 5A to 5C are diagrams illustrating an example of a written object added to a character string.
Figure 5B:
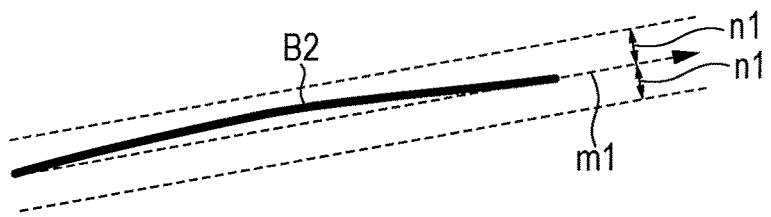
Figure 5C:
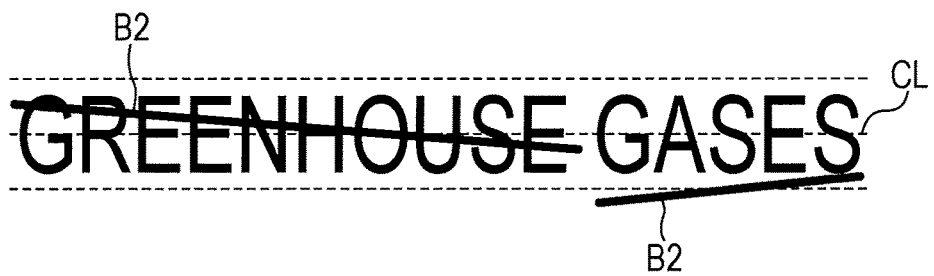

FIGS. 5A to 5C are diagrams illustrating an example when the written object B1 is added to the image A1. When the user operates the operating unit 11 while the written input is being received by the operation detection unit 28, the operation detection unit 28 acquires a position at which the operation of the user starts in the page P1 and a position corresponding to a trace of the operation. Moreover, the object generation unit 30 generates the written object B1 in the page P1 on the basis of the operation start position and the position corresponding to the trace of the operation acquired by the operation detection unit 28, for example. In the illustrated example, a rectilinear object B2 (B1) formed by a straight line on a character string, a double line object B6 (B1) formed by a double line, a surrounding frame object B8 (B1) formed by a rectangle, and a character object B10 (B1) formed by a character are added to the image A1. These objects are objects generated by a drawing based on the trace of the operation of the user. Due to this, an underline (a double underline) or a surrounding frame added to a character string may be inclined in relation to the reference direction F1 or may not be added to an appropriate position of the character string. The rectilinear object B2, the double line object B6, and the surrounding frame object B8 are included in a linear object formed by lines which are written-input according to the operation of the user. Moreover, the written object B1 formed by a curve including a wavy line and a double wavy line is also included in the linear object. In contrast, a character, a symbol, or the like is not included in the linear object.

When an instruction to end reception of a written input is detected by the operation detection unit 28 after the written object B1 is added to the image A1 by the object generation unit 30, even when a subsequent operation on the operating unit 11 is detected by the operation detection unit 28, the operation detection unit 28 does not receive the operation as a written input. The object determination unit 32 is activated when an instruction to end reception of the written input is detected by the operation detection unit 28.

The object determination unit 32 is a processing unit that determines a type of the written object S1. The type of each of the written objects B1 added to the image A1 by the object generation unit 30 while the written input is being received is not yet determined. When reception of the written input by the operation detection unit 28 ends, the object determination unit 32 determines the type of the written object B1 in the page P1. First, the object determination unit 32 determines that objects separated by a predetermined distance or longer are different written objects B1. In the example of FIG. 5A, the object determination unit 32 detects a distance between an object added to surround a character "Reference 1" included in the image A1 and an object added on an Arabic number "130". When the distance is equal to or larger than a predetermined value, the object determination unit 32 determines that these two objects are different written objects B1. Similarly, the distance between the other objects is detected, and it is determined that the objects are different written objects B1 when the distance between the objects is equal to or larger than a predetermined value.

When the written objects B1 added to the image A1 are determined, the object determination unit 32 determines whether the written object B1 is a correction target written object B1 or a non-correction target written object B. The object determination unit 32 determines whether the written object B1 is a correction target written object B1 which is added to the character string on the basis of the position of the written object B1 in relation to the character string included in the image A1. In the present embodiment, the object determination unit 32 determines that a written object B1 which is added outside a predetermined range from the character string of the image A1 is the non-correction target written object B1. This is because it is determined that the written object B1 added outside the predetermined range from the character string is not written to the character string. Moreover, the object determination unit 32 determines that a written object B1 formed by a character is a non-correction target written object B1. This is because the written object B1 formed by a character can be recognized in a state of being added according to the written input even when the written object is not corrected. However, all written objects B1 may be regarded as correction-target objects.

The object determination unit 32 further determines a character string to which the correction target written object B1 is added among the character strings included in the image A1. As an example, it is determined whether the written object B1 is present within a predetermined distance from each character string included in the image A1, and it is determined that the written object B1 present within a predetermined distance from a certain character string is the written object B1 that is added to the character string. As a criterion for determining whether the written object B1 is within a predetermined distance from a character string, when a predetermined percent (for example, 60%) of lines or more among the lines that form the written object B1 are within a predetermined distance from the character string, the written object B1 may be determined to be the written object B1 added to the character string.

Subsequently, the object determination unit 32 determines the type of the written object B1 determined to be a correction target. The object determination unit 32 detects an endpoint of the written object B1. When two end points are detected and the written object B1 is within a predetermined range from a straight line that connects the two end points, the object determination unit 32 determines that the written object B1 is the rectilinear object B2. In the example of FIG. 5B, since two end points are detected, the written object B1 is within a predetermined range from a straight line m1 that connects the two end points. Therefore, the object determination unit 32 determines that the written object B1 is a rectilinear object B2.

Furthermore, the object determination unit 32 determines whether the rectilinear object B2 is written to the character string as an underline or a strikethrough on the basis of the position of the rectilinear object B2 added to the character string. For example, as illustrated in FIG. 5C, when it is determined that the rectilinear object B2 is added to a character string a1, and the rectilinear object B2 is added on the upper side in the page P1 than a central line CL of the character string a1, the object determination unit 32 determines that the rectilinear object B2 is a strikethrough added to the character string a1. On the other hand, when the rectilinear object B2 is added on the lower side in the page P1 than the central line CL of the character string a1, the object determination unit 32 determines that the rectilinear object B2 is an underline.

Figure 6A:
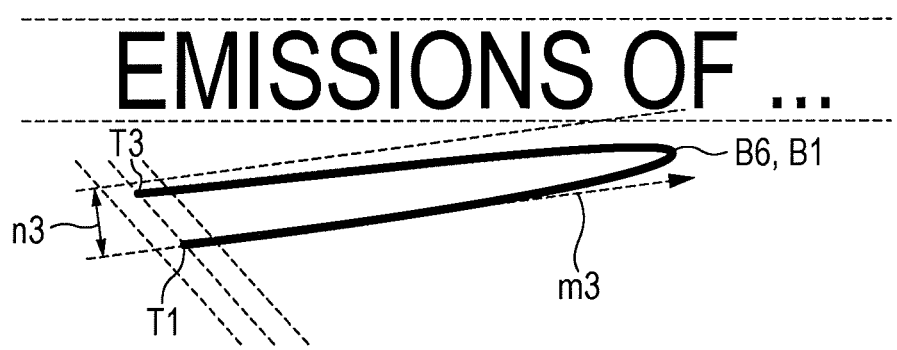
FIGS. 6A and 6B are diagrams illustrating an example of a written object added to a character string.

When two end points are detected from the written object B1 and the written object B1 is not within a predetermined range from the straight line m1 that connects the two end points, it is determined that the written object B1 is not the rectilinear object B2. Subsequently, when two approximately parallel lines that pass the end points within a predetermined range are detected from the written object B1, it is determined by the object determination unit 32 that the written object B1 is a double line. As illustrated in FIG. 6A, since the written object B1 has end points T1 and T3 and is in a region separated by a distance n1 or longer from a straight line that connects the two end points, it is determined that the written object B1 is not the rectilinear object B2. Moreover, since two lines that pass through the end points T1 and T3 of the written object B1 are approximately parallel and the distance between the two lines is equal to or larger than n3, the object determination unit 32 determines that the written object B1 is a double line object B6.

Figure 6B:
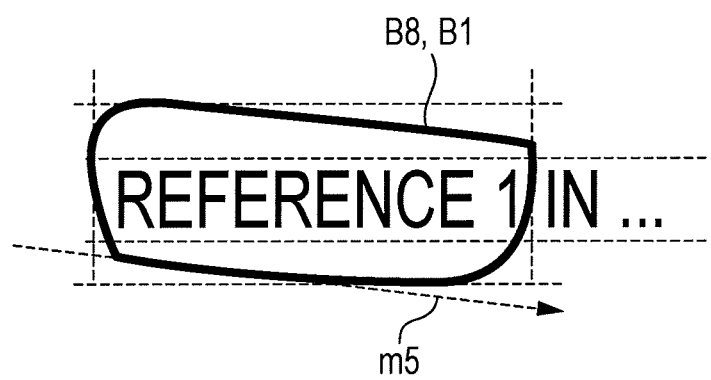

Furthermore, when no end point is detected from the written object B1, the object determination unit 32 analyzes the shape of the written object B1. When the written object B1 is approximately rectangular, the object determination unit 32 determines that the written object B1 is a surrounding frame object B8. As illustrated in FIG. 6B, when no end point is detected and lines corresponding to four edges are detected from the written object B1 added on the character string, it is determined that the written object B1 is a rectangle and is a surrounding frame object B8.

Returning to FIG. 3, the inclination detection unit 34 is activated when the object determination unit 32 determines that the written object B1 is any one of the rectilinear object B2, the double line object B6, and the surrounding frame object B8. The inclination detection unit 34 is a processing unit that detects an inclination direction F3 of the written object B1 added to the image A1. In the present embodiment, the inclination detection unit 34 detects the inclination direction F3 on the basis of an arrangement of an object when the written object B1 is any one of the rectilinear object B2, the double line object B6, and the surrounding frame object B8. In the present embodiment, the inclination direction F3 is the direction in which an object is arranged. When the inclination direction F3 is detected and the inclination direction F3 is corrected on the basis of the reference direction F1 of the image A1, the object is arranged in a direction appropriate for the reference direction F1 and the object is added at an appropriate position.

The inclination detection unit 34 detects the inclination direction F3 depending on the rectilinear object B2, the double line object B6, and the surrounding frame object B8. For example, in the case of the rectilinear object B2, the inclination detection unit 34 determines a straight line m1 that connects the two end points of the rectilinear object B2 as the inclination direction F3 of the rectilinear object B2 as illustrated in FIG. 5B.

In the case of the double line object B6, the inclination detection unit 34 detects the inclination direction F3 of the double line object B6 by linear approximation. FIG. 6A is a diagram illustrating an example of detection of the inclination direction F3 of the double line object B6. An approximated straight line m3 is obtained using the least-squares method, for example, and the obtained approximated straight line m3 is determined as the inclination direction F3 of the double line object B6. Alternatively, the inclination detection unit 34 may detect a straight line m4 that makes contact with a predetermined percent of lines or more among the lines that form the double line object B6. Moreover, a straight line m4 that is most approximately parallel to the reference direction F1 among the detected straight lines m4 may be determined as the inclination direction F3.

In the case of the surrounding frame object B8, the inclination detection unit 34 detects the inclination direction F3 of the surrounding frame object B8 by linear approximation similarly to the double line object B6. FIG. 6B is a diagram illustrating an example when the inclination direction F3 of the surrounding frame object B8 is detected. The inclination detection unit 34 determines an approximated straight line m5 obtained by the least-square method, for example, as the inclination direction F3 of the surrounding frame object B8. Alternatively, the inclination detection unit 34 may detect straight lines m6 that make contact with a predetermined percent of each edge of the surrounding frame object B8. Moreover, a straight line m6 that is most approximately parallel to the reference direction F1 among the detected straight lines m6 may be determined as the inclination direction F3.

Returning to FIG. 3, the correction unit 36 further functions as a difference detection unit 50, an object correction unit 52, and a document correction unit 54. The difference detection unit 50 is a processing unit that detects a difference between the angle of the reference direction F1 of the image A1 and the angle of the inclination direction F3 of the written object B1. The object correction unit 52 is a processing unit that corrects the written object B1 on the basis of the reference direction F1. The document correction unit 54 is a processing unit that corrects the image A1 that includes a character string so as to be parallel to one edge of the page P1.

Figure 7A:
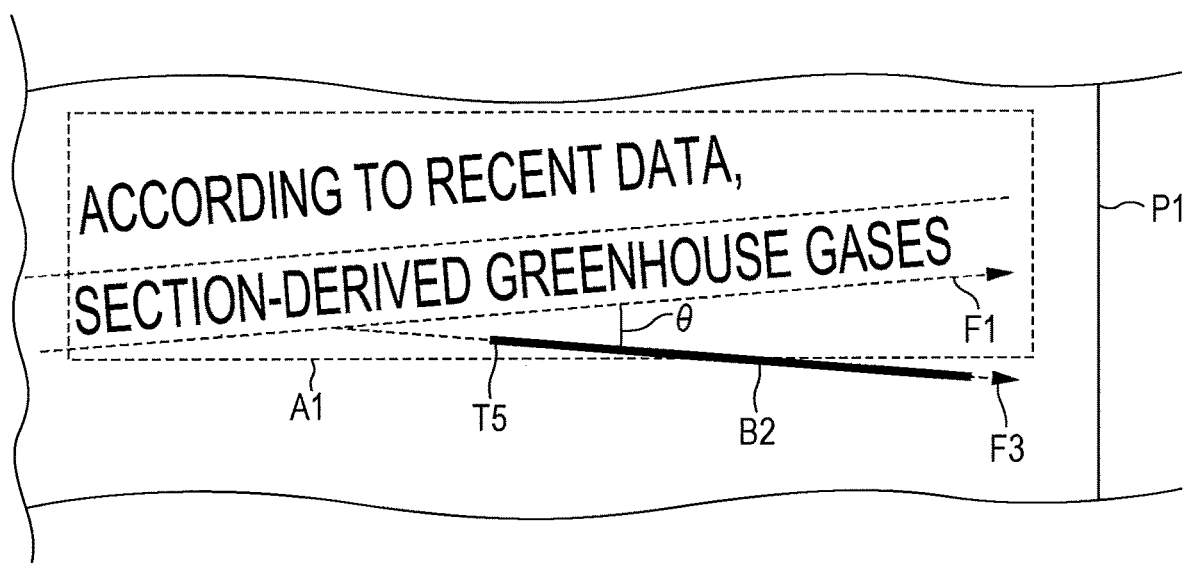
FIGS. 7A and 7B are diagrams illustrating an example when a written object is corrected.
Figure 7B:
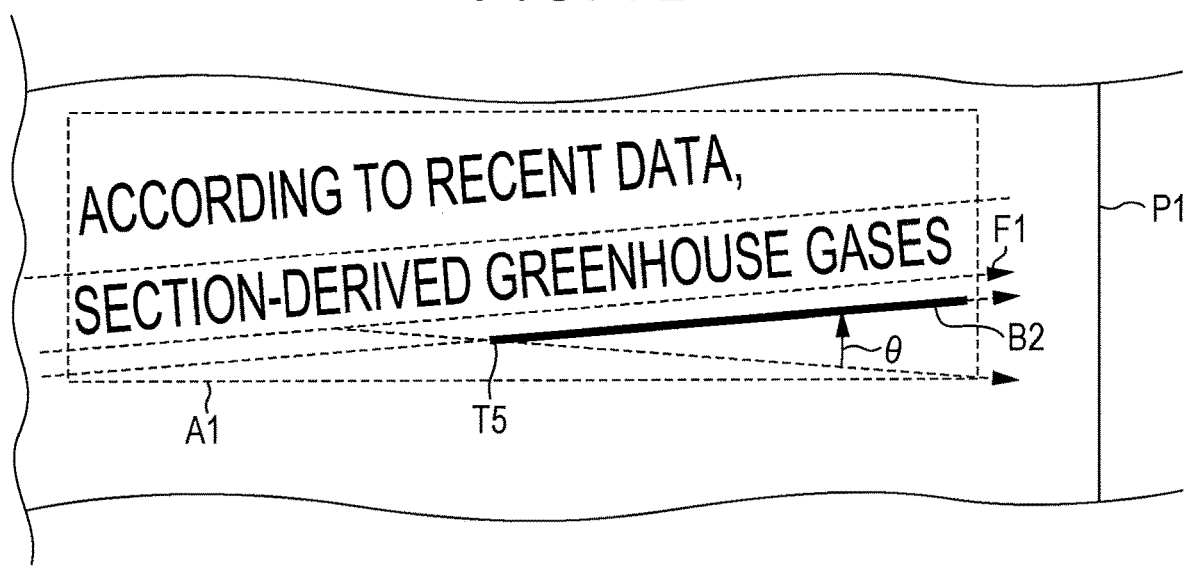

The difference detection unit 50 detects the angle between the reference direction F1 of the image A1 and the inclination direction F3 of the written object B1. FIGS. 7A and 7B are diagrams illustrating an example when the written object B1 is corrected by the correction unit 36. As illustrated in FIG. 7A, the difference detection unit 50 detects an angle θ between the reference direction F1 of the image A1 and the inclination direction F3 of the rectilinear object B2 (B1). When the angle θ between the reference direction F1 and the inclination direction F3 is detected by the difference detection unit 50, the object correction unit 52 rotates the rectilinear object B2 about an end point T5 of the rectilinear object B2, for example, until the rectilinear object B2 is parallel to the reference direction F1 as illustrated in FIG. 7B. In this way, since the rectilinear object B2 is displayed in parallel to an arrangement direction of the character string included in the image A1, it is possible to understand a character string to which the rectilinear object B2 is added.

Figure 8:
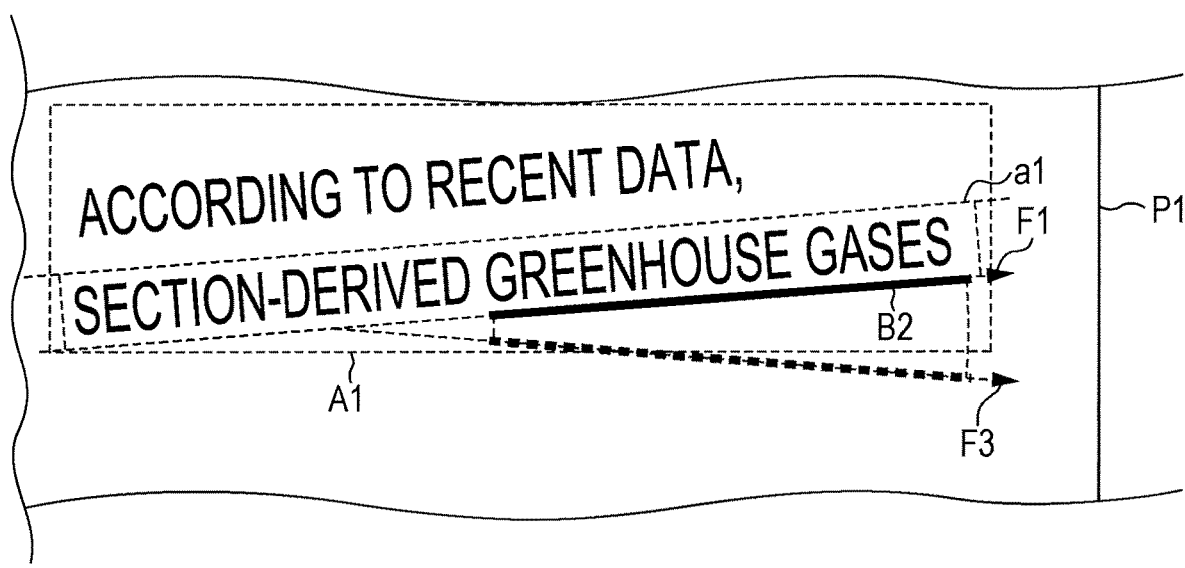
FIG. 8 is a diagram illustrating an example when a written object is corrected.

FIG. 8 is a diagram illustrating an example of another aspect of correction different from that illustrated in FIGS. 7A and 7B. In the example of the correction example illustrated in FIGS. 7A and 7B, the corrected position of the rectilinear object B2 is determined by the position of the end point T5 serving as an axis when the rectilinear object B2 is rotated. For example, when the end point T5 is at a position overlapping the character string, the corrected rectilinear object B2 is disposed at a position overlapping the character string. As illustrated in FIGS. 7A and 7B, even when it is possible to infer that the user intends to add the rectilinear object B2 as an underline on the character string, if the end point T5 is at a position overlapping the character string, and the corrected rectilinear object B2 is disposed on the character string, whereby a result that is contrary to the user's intention is obtained.

Therefore, in the example illustrated in FIG. 8, the object determination unit 32 determines that the rectilinear object B2 before correction is an underline on a character string a2 on the basis of the position of the rectilinear object B2 in relation to the character string a2. Depending on the determination result obtained by the object determination unit 32, the object correction unit 52 detects a straight line parallel to the reference direction F1, passing through a predetermined position near the lower end of the character string a2, for example, and projects the rectilinear object B2 in a direction orthogonal to the detected straight line as a projection direction. Moreover, the object correction unit 52 corrects the rectilinear object B2 to a rectilinear object B2' generated by projecting the rectilinear object B2 on the straight line. In this way, the object correction unit 52 can correct the rectilinear object B2 to be parallel to the reference direction F1 and specify that the rectilinear object B2 is an underline on the character string a2. That is, in the example of FIG. 8, the object correction unit 52 detects a straight line that is parallel to the reference direction F1 within or near the character string according to the position of the rectilinear object B2 in relation to the character string a2. Moreover, the object correction unit 52 projects the rectilinear object B2 on the detected straight line and converts the rectilinear object B2 to a segment generated by the projection to thereby realize correction.

When the object determination unit 32 determines that the written object B1 is a correction target object, the object correction unit 52 arranges the written object 31 at a position set in advance for the character string. In the example of FIG. 5C, the object determination unit 32 determines a character string to which the written object B1 is added among the character strings included in the image A1 on the basis of the position of the written object B1 in relation to the character strings included in the image A1. Moreover, as illustrated in FIG. 5C, when it is determined that the rectilinear object B2 is added to the character string a1, the object determination unit 32 further determines whether the rectilinear object B2 is a strikethrough added to the character string a1 or an underline added to the character string a1 on the basis of the position of the rectilinear object B2 in relation to the character string a1.

For example, when the rectilinear object B2 is added on the upper side than the central line CL of the character string a1, it is determined that the rectilinear object B2 is a strikethrough. When the object determination unit 32 determines that the rectilinear object B2 is a strikethrough, the object correction unit 52 moves the rectilinear object B2 so that at least one end point of the rectilinear object B2 is positioned on the central line CL of the character string a1, for example. Alternatively, as described above, the rectilinear object B2 corrected so as to be parallel to the reference direction F1 may be moved on the central line CL of the character string a1.

In the example of FIG. 5C, the object determination unit 32 determines that the rectilinear object B2 is an underline added to the character string when the rectilinear object B2 is added on the lower side than the central line CL of the character string a1. When the object determination unit 32 determines that the rectilinear object B2 is a underline, the object correction unit 52 moves the rectilinear object B2 so that at least one end point of the rectilinear object B2 is positioned at the lower end of the character string. Alternatively, the rectilinear object B2 corrected so as to be parallel to the reference direction F1 may be moved to the lower end of the character string. In this way, it is determined that the rectilinear object B2 added to the character string is the strikethrough or the underline and the appearance is improved. Even when the object determination unit 32 determines that the rectilinear object B2 is a double line object B6, the object correction unit 52 moves the double line object B6 on the basis of the position of the character string at which the double line object B6 is added.

The object correction unit 52 may correct the inclination direction F3 so as to match the reference direction F1 when the angle between the reference direction F1 and the inclination direction F3 of the written object B1 detected by the inclination detection unit 34 is within a predetermined value and may not correct the inclination direction F3 when the angle between the reference direction F1 and the inclination direction F3 is larger than the predetermined value. This predetermined value can be set in advance by the user. When the angle between the inclination direction F3 and the reference direction F1 is relatively large, since it is highly likely that the user has intentionally added the written object B1 so that the angle with respect to the reference direction F1 increases, if the written object B1 is corrected on the basis of the reference direction F1, the written object B1 may be corrected contrary to the user's intention. Therefore, when the angle between the reference direction F1 and the inclination direction F3 is equal to or larger than the predetermined value set by the user, no correction is performed. In this way, it is possible to prevent correction that is contrary to the user's intention.

Figure 9A:
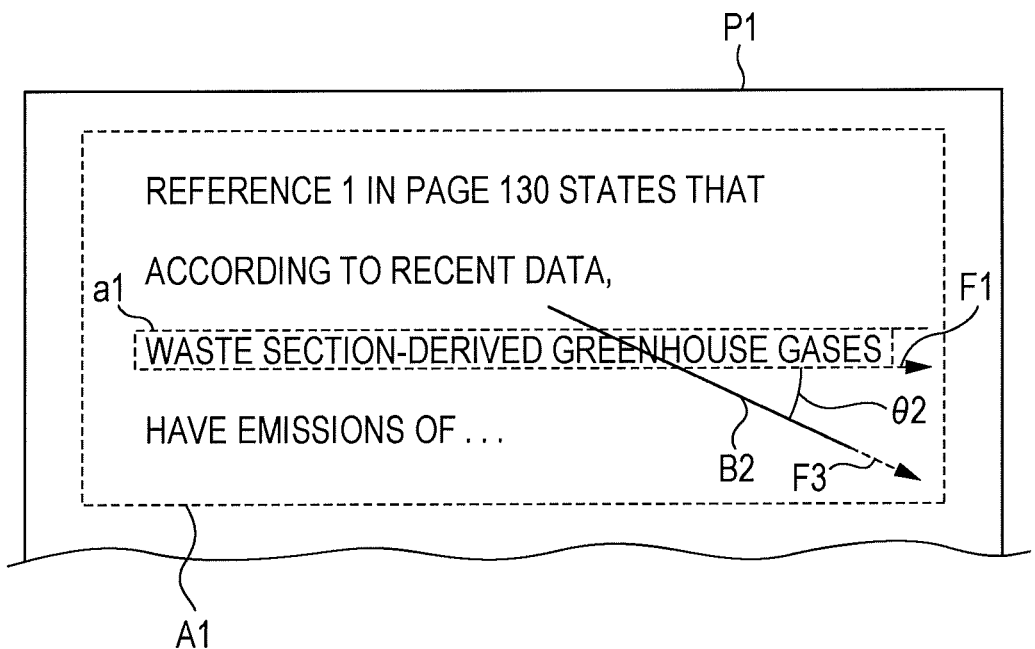
FIGS. 9A and 9B are diagrams illustrating an example when a written object is corrected.

FIG. 9A is a diagram illustrating an example of the rectilinear object B2 when the angle between the reference direction F1 and the inclination direction F3 is relatively large. When the inclination direction F3 of the rectilinear object B2 is detected by the inclination detection unit 34, the difference detection unit 50 detects an angle θ2 between the reference direction F1 of the image A1 and the inclination direction F3. The object correction unit 52 is activated when the angle θ2 is detected by the difference detection unit 50. Moreover, when the angle θ2 is larger than a predetermined value α1 set in advance, the object correction unit 52 does not correct the rectilinear object B2. In the example of the aspect in which the rectilinear object B2 is added, it is not possible to determine whether the rectilinear object B2 is added to the character string a2 as a strikethrough by the user, an underline, or a diagonal line for removing the character string a2. Therefore, in such a case, the object correction unit 52 does not correct the rectilinear object B2 on the basis of the reference direction F1. In this way, the written object B1 is prevented from being corrected contrary to the user's intention.

Instead of the above, the object correction unit 52 may perform the following process. When the written object B1 is the rectilinear object B2 or the double line object B6, the object correction unit 52 detects the length of the rectilinear object B2 or the double line object B6 in the reference direction F1. Moreover, when the length in the reference direction F1 is equal to or larger than a predetermined value (for example, 10 mm), the rectilinear object B2 or the double line object B6 is corrected when the angle θ between the reference direction F1 and the inclination direction F3 is smaller than the predetermined value α1. On the other hand, when the length of the rectilinear object B2 or the double line object B6 in the reference direction F1 is smaller than the predetermined value (for example, 10 mm), the rectilinear object B2 or the double line object B6 is corrected when the angle θ between the reference direction F1 and the inclination direction F3 is smaller than a value α2 larger than the predetermined value α1.

Figure 9B:
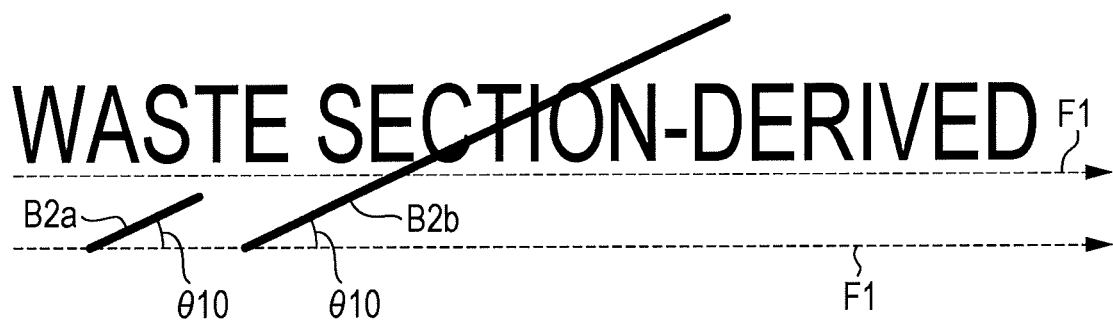

As illustrated in FIG. 9B, a rectilinear object B2a and a rectilinear object B2b that is longer than the rectilinear object B2a are added at an inclination of θ10 with respect to the reference direction F1. The rectilinear object B2a is an underline added to one character included in a character string, whereas it is not possible to determine whether the rectilinear object B2b is an underline added to the character string, a strikethrough, or a diagonal line added to remove the character string. If the rectilinear object B2b is corrected on the basis of the reference direction F1, the rectilinear object B2b may be corrected contrary to the user's intention of adding the rectilinear object B2b. Therefore, a criterion for determining whether correction will be performed according to the length of the rectilinear object B2 is set, and the angle (α2) serving as a criterion for determining whether the rectilinear object B2a will be corrected is set to a value larger than the angle (α1) serving as a criterion for determining whether the rectilinear object B2b that is longer than the rectilinear object B2a will be corrected. In this way, it is possible to appropriately determine whether correction will be performed or not. Although the case of the rectilinear object B2 has been illustrated in the drawing, the object correction unit 52 performs the same process as that described using the rectilinear object B2 even when the object is the double line object B6 included in a linear object or the written object B1 formed by a curve such as a wavy line.

Figure 10A:
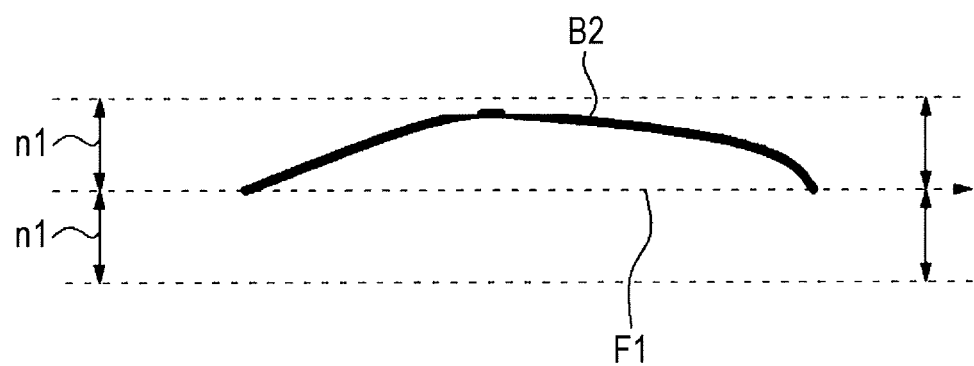
FIGS. 10A and 10B are diagrams illustrating an example when a rectilinear object is corrected.
Figure 10B:
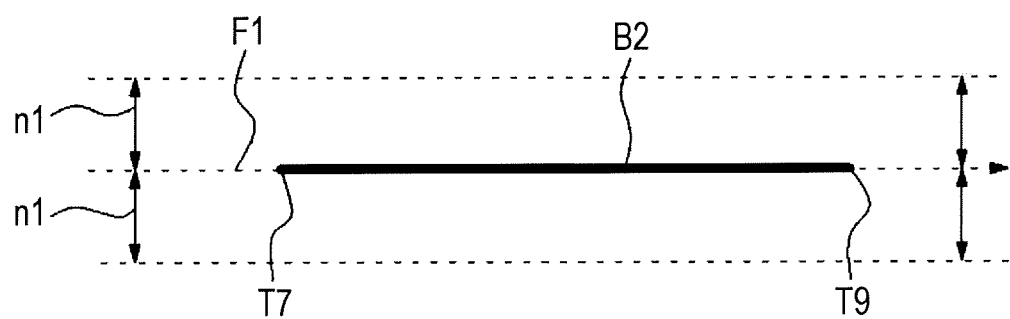

As described above, when the written object B1 is within a range of a distance n1 in a direction vertical to a segment that connects two end points, the object determination unit 32 determines that the written object B1 is a rectilinear object B2. Moreover, the object correction unit 52 may correct the rectilinear object B2 to the segment that connects the two end points. FIGS. 10A and 10B are diagrams illustrating an example when the rectilinear object B2 is corrected to a segment that connects two end points. As illustrated in FIG. 10A, in many cases, the rectilinear object B2 which is input according to an operation of the user is not a shortest segment that connects two end points. Therefore, the object correction unit 52 corrects the rectilinear object B2 to a segment that connects end points T7 and T9 as illustrated in FIG. 10B. In this way, it is possible to improve the appearance of the rectilinear object B2.

Figure 11A:
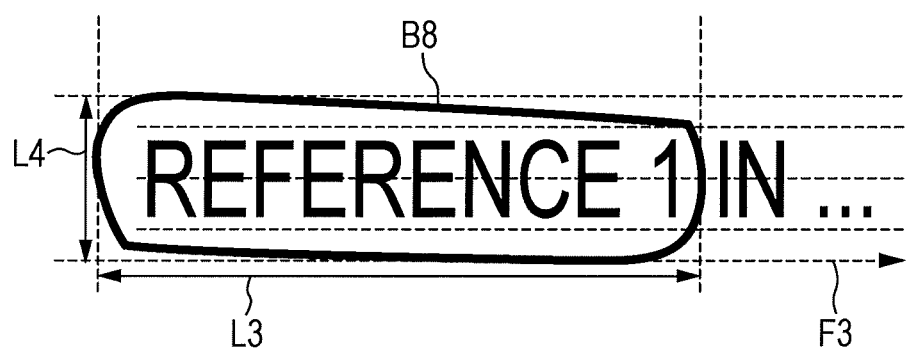
FIGS. 11A and 11B are diagrams illustrating an example when a surrounding frame object is corrected.
Figure 11B:
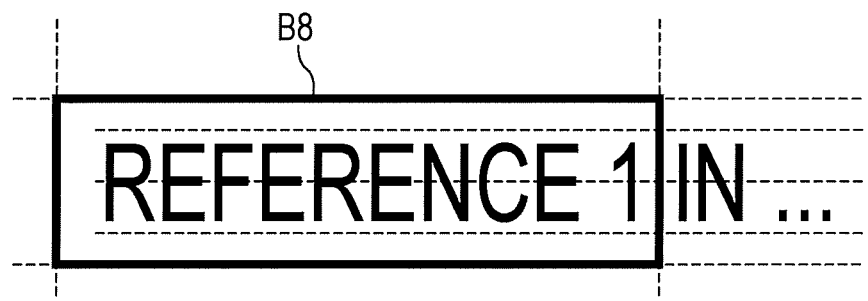

FIGS. 11A and 11B are diagrams illustrating an example when the surrounding frame object B8 is corrected. When the object determination unit 32 determines that the written object B1 is the surrounding frame object B8, the object correction unit 52 detects a length L3 of the surrounding frame object B8 in the inclination direction F3 detected by the inclination detection unit 34. Although the example of the drawing illustrates a case in which the inclination direction F3 and the reference direction F1 are approximately parallel to each other, the present invention is not limited to this, but the reference direction F1 and the inclination direction F3 may not be parallel to each other. Subsequently, the object correction unit 52 detects a length L4 of the surrounding frame object B8 in the direction vertical to the inclination direction F3. Moreover, the object correction unit 52 corrects the surrounding frame object B8 to a rectangle which is in contact with respective sides of the surrounding frame object B8 and of which the sides have lengths L3 and L4 as illustrated in FIG. 11B, for example. In this way, it is possible to improve the appearance of the surrounding frame object B8.

Returning to FIG. 3, the document correction unit 54 is a processing unit that corrects the image A1 including a character string so as to be parallel to one edge of the page P1. When the image A1 is inclined with respect to an edge of the page P1, the document correction unit 54 corrects the image A1 so that the reference direction F1 matches one edge of the page P1. For example, the document correction unit 54 detects an edge of the page P1 of which the angle with respect to the reference direction F1 is relatively small and rotates the image A1 on the basis of the detected edge. Moreover, the object correction unit 52 is activated when the image A1 is corrected by the document correction unit 54, and the object correction unit 52 corrects the written object B1 so that the inclination direction F3 of the written object B1 matches the edge of the page P1 detected by the document correction unit 54. In this way, the image A1 and the written object B1 are displayed in a state of being non-inclined with respect to the page P1.

The CPU 12 further includes the break detection unit 38. The break detection unit 38 is a processing unit that analyzes the character string detected by the character string detection unit 22 to detect the break position in the character string. The break detection unit 38 is detected when the character string included in the image A1 is detected by the character string detection unit 22. The break detection unit 38 detects a break position in the detected character string. As an example, the break detection unit 38 detects an interval between characters included in the character string as a break position of the character string when the interval is equal to or larger than a predetermined value. Moreover, the break detection unit 38 may detect a punctuation point included in the character string as the break position of the character string.

The break detection unit 38 further detects a break position of words in the character string. Dictionary information 62 that includes part-of-speech information based on grammar such as a noun, an adjective, a verb, an adverb, a conjunction, a particle, and an auxiliary verb is stored in advance in the storage unit 16. The break detection unit 38 reads the dictionary information 62 from the storage unit 16, analyzes the character string detected by the character string detection unit 22, and detects a break position of each word. FIGS. 12A to 12C are diagrams illustrating an example when a break position of the character string is detected. As illustrated in FIG. 12A, the break position of the character string is detected by the break detection unit 38. Although the example of the drawing illustrates a case in which the break position of each word is detected, the present invention is not limited to this, but the break position may be detected when a punctuation point is detected or an interval between characters is equal to or larger than a predetermined value, for example.

When the break position is detected by the break detection unit 38 and an end point of the written object B1 is within a predetermined range including the detected break position, the object correction unit 52 moves the end point to match the break position. FIGS. 12B and 12C are diagrams illustrating an example when the written object B1 is corrected on the basis of the break position. In the example of the drawing, the rectilinear object B2 is added on the lower side of the character string. In this case, the object correction unit 52 extracts breaking points h1 and h2 near the lower end of the character string at the break position of the character string and determines whether an end point of the rectilinear object B2 is present in a region R1 that includes the breaking point h1 and a region R3 that includes the breaking point h2.

When the end point of the rectilinear object B2 is present in the region R1 or R3, the object correction unit 52 moves the end point to match the breaking point in the region in which the end point is present. In the example of FIG. 12B, the end points of the rectilinear object B2 are present in the region R1 that includes the breaking point h1 and the region R3 that includes the breaking point h2. Therefore, as illustrated in FIG. 12C, the object correction unit 52 corrects the rectilinear object B2 by moving the end points to match the breaking points h1 and h2. In this way, the rectilinear object B2 is displayed between the breaking points of the character string and is corrected according to the user's intention.

Figure 13:
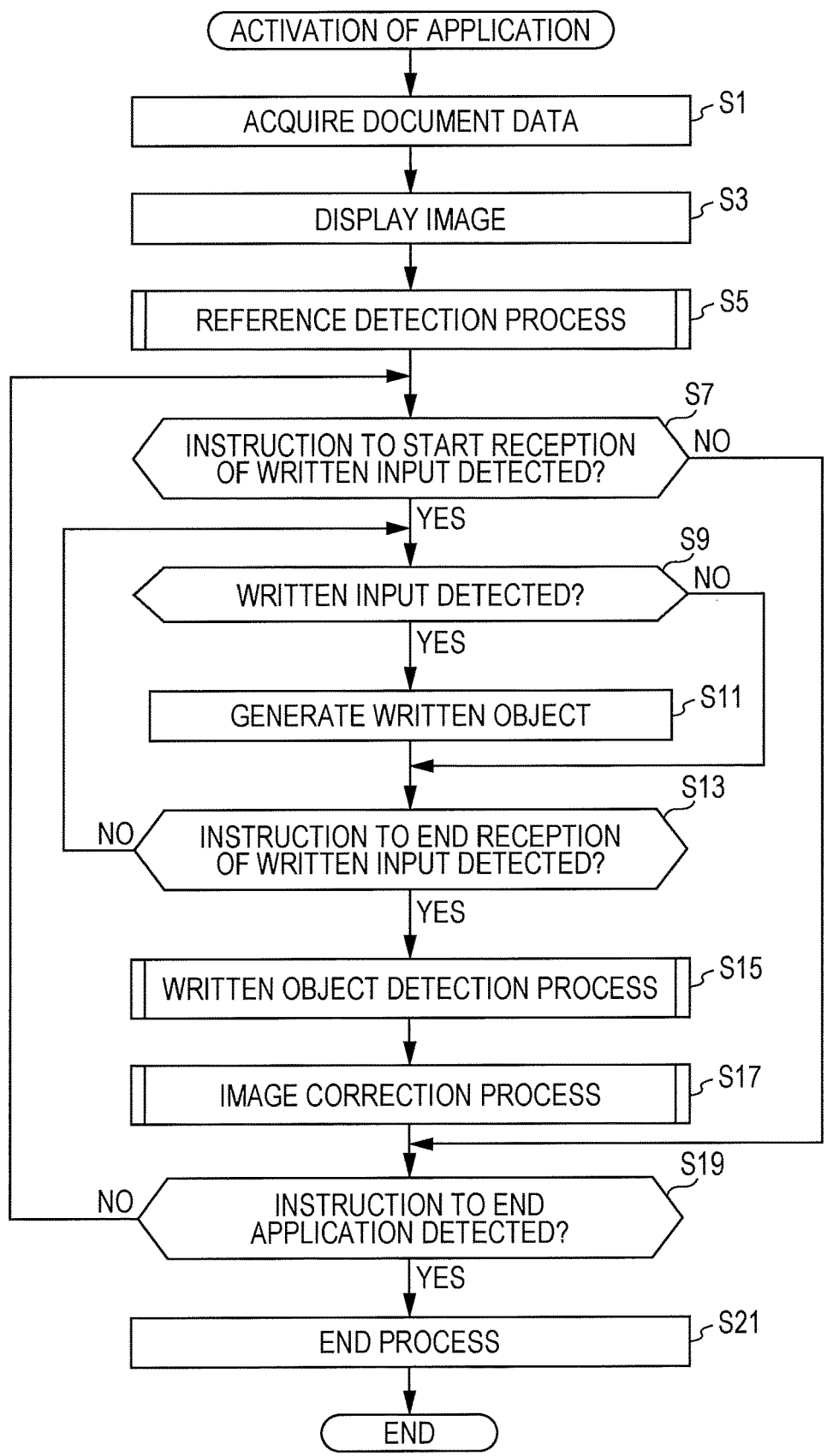
FIG. 13 is a flowchart illustrating an example of a major processing procedure performed by the information processing apparatus.

Next, an example of a processing procedure performed by the information processing apparatus 2 of the present embodiment will be described. FIG. 13 is a flowchart illustrating an example of a major processing procedure performed by the information processing apparatus 2. When an application is activated by the CPU 12 executing a program 60 stored in the storage unit 16, the information processing apparatus 2 acquires the document data D1 (step S1). The document data D1 may be acquired from an external apparatus such as the image processing apparatus 4, and the document data D1 stored in the storage unit 16 may be read. Moreover, the information processing apparatus 2 reads the document data D1 and displays the page P1 that includes the image A1 (step S3). When the page P1 is displayed, a reference detection process (step S5) of detecting the reference direction F1 from the image A1 in the page P1 is executed. A specific processing procedure of the reference detection process (step S5) will be described later.

Subsequently, in a state where the image A1 is displayed, it is detected whether an instruction to start reception of a written input by the user is detected (step S7). When the instruction to start reception of a written input is detected (step S7: YES), the information processing apparatus 2 further determines whether the written input by the user is detected (step S9). When the written input is detected (step S9: YES), the information processing apparatus 2 generates the written object B1 (step S11). The information processing apparatus 2 may display the generated written object B1 on the display unit 10. On the other hand, when the written input is not detected (step S9: NO), step S11 is skipped. Moreover, it is determined whether an instruction to end reception of the written input is detected (step S13), and when the instruction is not detected (S13: NO), steps S9 to S13 are repeatedly executed until the instruction is detected. On the other hand, when the instruction to end reception of the written input is detected (step S13: YES), the information processing apparatus 2 executes a written object detection process (step S15) of determining the written object B1 generated in step S11 and detecting an inclination direction. A specific processing procedure of the written object detection process (step S15) will be described later.

When the written object detection process (step S15) is performed, the information processing apparatus 2 executes an image correction process (step S17) of correcting the written object B1 or the image A1. A specific processing procedure of the image correction process will be described later. Finally, the information processing apparatus 2 determines whether an instruction to end the application by the user is detected (step S19). When the instruction to end the application is detected (step S19: YES), the information processing apparatus 2 performs a process of ending the application (step S21) and ends the process. On the other hand, when the instruction to end the application is not detected (step S19: NO), the flow returns to step S7 and the processes of steps S7 to S17 are repeatedly performed until the instruction to end the application is detected. When the instruction to start reception of the written input is not detected in step S7 (step S7: NO), the processes of steps S9 to S17 are skipped.

Figure 14:
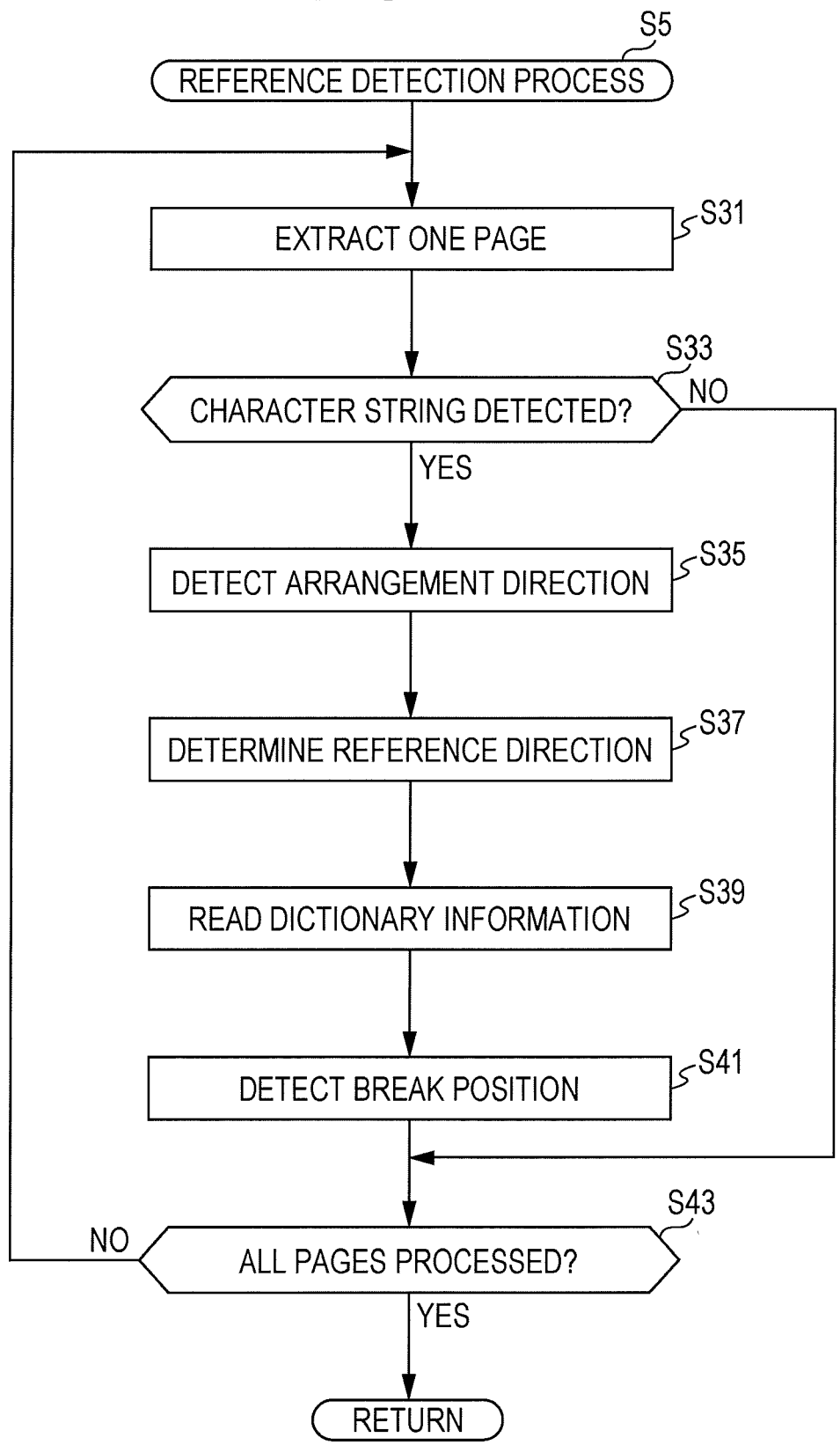
FIG. 14 is a flowchart illustrating an example of a specific processing procedure of a reference detection process.

FIG. 14 is a flowchart illustrating an example of a specific processing procedure of the reference detection process (step S5 in FIG. 13). First, the information processing apparatus 2 extracts one page from the pages P1 that form the document data D1 (step S31) and determines whether a character string is detected (step S33). When the character string is detected (step S33: YES), an arrangement direction of the character string is detected (step S35). Moreover, the detected arrangement direction is determined as the reference direction (step S37).

Subsequently, the information processing apparatus 2 reads the dictionary information 62 stored in the storage unit 16 (step S39). Moreover, a break position of a word in the character string is detected using the dictionary information 62 (step S41). Instead of this, the information processing apparatus 2 may detect the position of a punctuation point or a position at which the interval between characters is equal to or larger than a predetermined value as the break position of the character string. Finally, it is determined whether all pages P1 included in the document data D1 have been processed (step S43). When all pages P1 have been processed (step S43: YES), the reference detection process ends. On the other hand, when all pages P1 have not been processed (step S43: NO), the flow returns to step S31, and the processes of steps S31 to S41 are repeatedly executed until all pages P1 are processed. When a character string is not detected in the page P1 in step S33 (step S33: NO), the processes of steps S35 to S41 are skipped.

Figure 15:
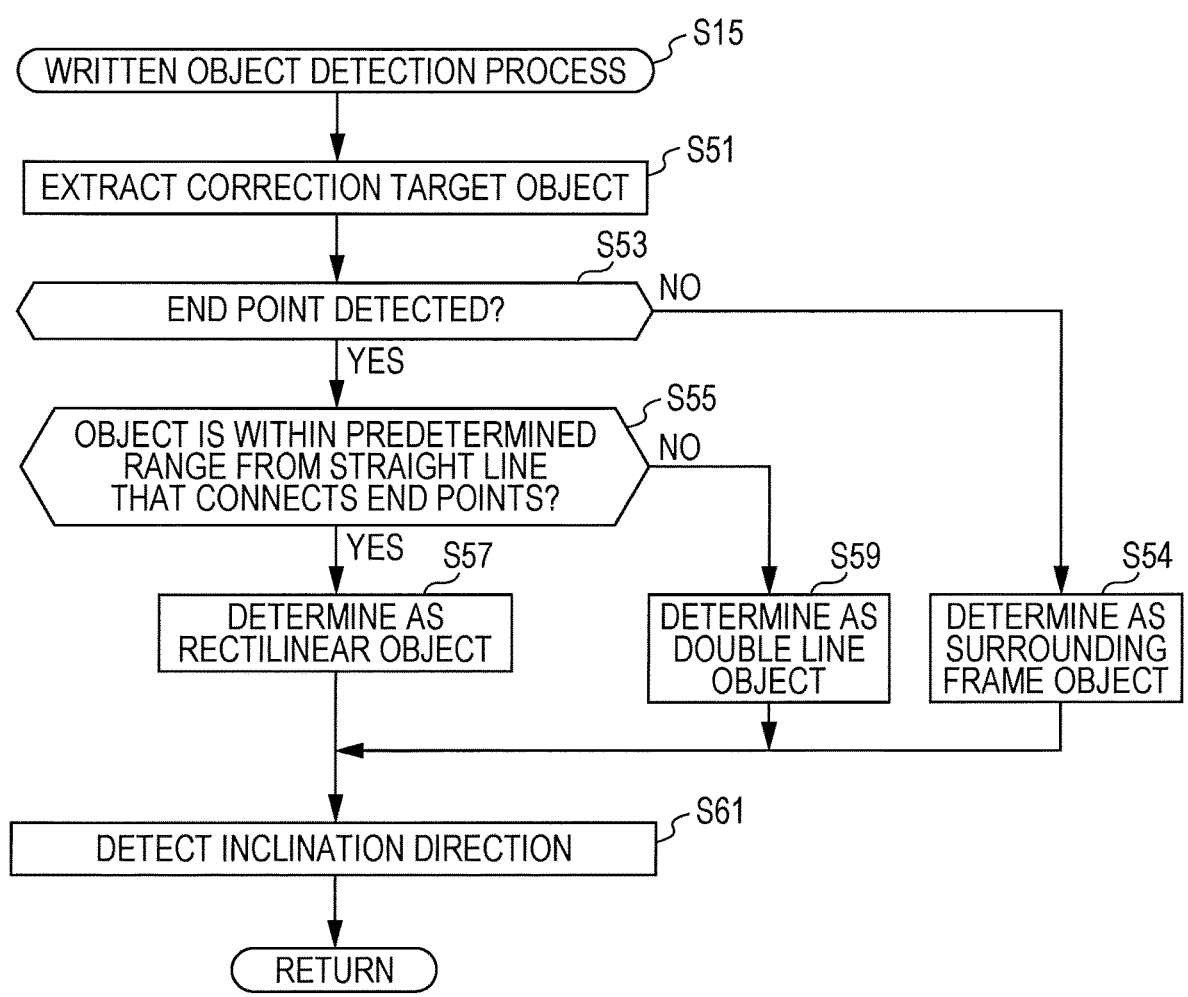
FIG. 15 is a flowchart illustrating an example of a specific processing procedure of a written object detection process.

FIG. 15 is a flowchart illustrating an example of a specific processing procedure of the written object detection process (step S15 in FIG. 13). When the instruction to end reception of the written input is detected (step S13 in FIG. 13), the information processing apparatus 2 extracts a written object B1 which is a correction target (step S51). The written object B1 which is a correction target includes the rectilinear object B2, the double line object B6, and the surrounding frame object B8, for example. The written object B1 which is a non-correction target includes a written object B1 of which the distance to the character string is equal to or larger than a predetermined value and a written object B1 formed by a character, for example. When the written object B1 which is a correction target is extracted, the information processing apparatus 2 determines whether an end point is detected from the extracted written object B1 (step S53). When the end points are detected (step S53: YES), it is determined further whether the written object B1 is within a predetermined range from a straight line that connects the detected end points (step S55).

When the written object B1 is within a predetermined range from a straight line that connects the detected end points (step S55: YES), the information processing apparatus 2 determines that the written object B1 is the rectilinear object B2 (step S57). On the other hand, when the written object B1 is outside the predetermined range from the straight line that connects the detected end points (step S55: NO), the information processing apparatus 2 determines that the written object B1 is the double line object B6 (step S59). Moreover, when no end point is detected from the written object B1 in step S53 (step S53: NO), the information processing apparatus 2 determines that the written object B1 is the surrounding frame object B8 (step S54). Finally, the inclination direction of each of the determined written object B1 is detected (step S61), and the written object detection process ends.

Figure 16:
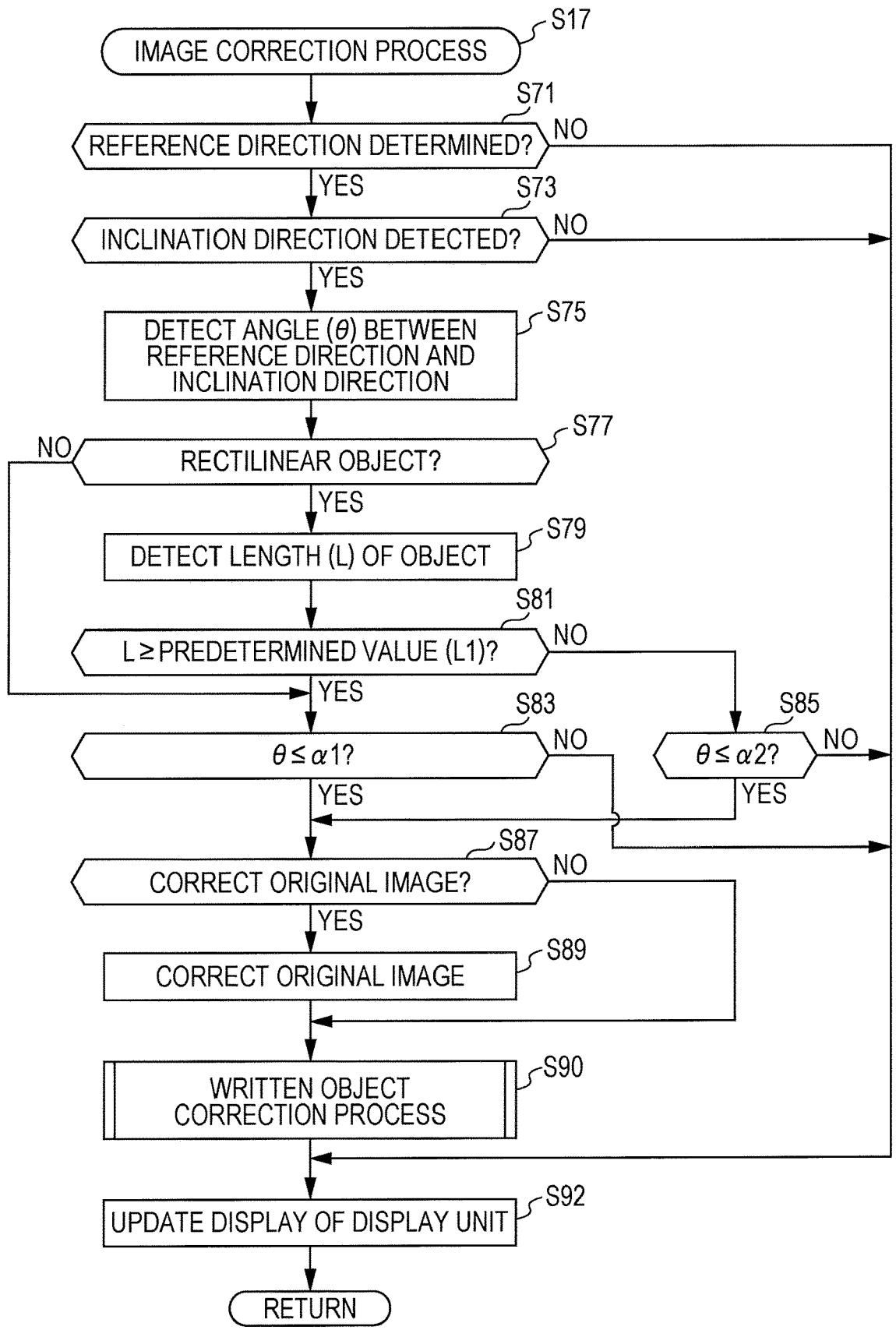
FIG. 16 is a flowchart illustrating an example of a specific processing procedure of an image correction process.

FIG. 16 is a flowchart illustrating an example of a specific processing procedure of the image correction process (step S17 in FIG. 13). In the image correction process, the information processing apparatus 2 first determines whether the reference direction F1 has been determined (step S71). When the reference direction F1 is determined (step S71: YES), the information processing apparatus 2 determines whether the inclination direction F3 has been detected (step S73). Moreover, when the inclination direction F3 has been detected (step S73: YES), the information processing apparatus 2 detects the angle between the reference direction F1 and the inclination direction F3 (step S75). On the other hand, when either the reference direction F1 or the inclination direction F3 is not detected (step S71 or S73: NO), the information processing apparatus 2 updates the display of the display unit 10 in a state where the written object B1 is displayed on the display unit 10 (step S92) and ends the image correction process.

When the angle (θ) between the reference direction F1 and the inclination direction F3 is detected (step S75), it is determined whether the written object B1 is the rectilinear object B2 (step S77). When it is determined that the written object B1 is the rectilinear object B2 (step S77: YES), the information processing apparatus 2 detects the length (L) of the rectilinear object B2 (step S79). Moreover, it is determined whether the length (L) of the rectilinear object B2 is equal to or larger than a predetermined value (L1) set in advance (step S81). When the length (L) of the rectilinear object B2 is equal to or larger than the predetermined value (L1) (step S81: YES), the information processing apparatus 2 determines whether the angle (θ) between the reference direction F1 and the inclination direction F3 is equal to or smaller than the predetermined value α1 (step S83). On the other hand, when the length (L) of the rectilinear object B2 is a value smaller than the predetermined value (L1) (step S81: NO), the information processing apparatus 2 determines whether the angle (θ) between the reference direction F1 and the inclination direction F3 is equal to or smaller than α2 that is larger than α1 (step S85). This is because a small rectilinear object B2 is sometimes inclined at a large angle with respect to the reference direction F1. Therefore, as for the rectilinear object B2 of which the length is smaller than the predetermined value (L1), the image is corrected when the angle (θ) between the reference direction F1 and the inclination direction F3 is equal to or smaller than α2 which is larger than α1 which is used when the length is equal to or larger than the predetermined value (L1).

When the angle (θ) is smaller than α1 in step S83 (step S83: YES), or the angle (θ) is larger than α2 which is larger than α1 in step S85, the image is corrected. On the other hand, when the angle (θ) is equal to or larger than α1 in step S83 (step S83: NO), or the angle (θ) is equal to or larger than α2 in step S85 (step S85: NO), correction is not performed. When the angle (θ) is equal to or smaller than α1 in step S83 (step S83: YES), or the angle (θ) is equal to or smaller than α2 in step S85 (step S85: YES), the information processing apparatus 2 determines whether the image A1 is to be corrected or not (step S87). When it is determined that the image A1 is to be corrected (step S87: YES), the image A1 is corrected (step S89). When it is determined that the image A1 is not to be corrected (step S87: NO), step S89 is skipped.

Subsequently, a written object correction process (step S90) of correcting the written object B1 is executed. A specific processing procedure of the written object correction process (step S90) will be described later. Finally, the display of the image A1 and the written object B1 displayed on the display unit 10 is updated (step S92) and the image correction process ends.

Figure 17:
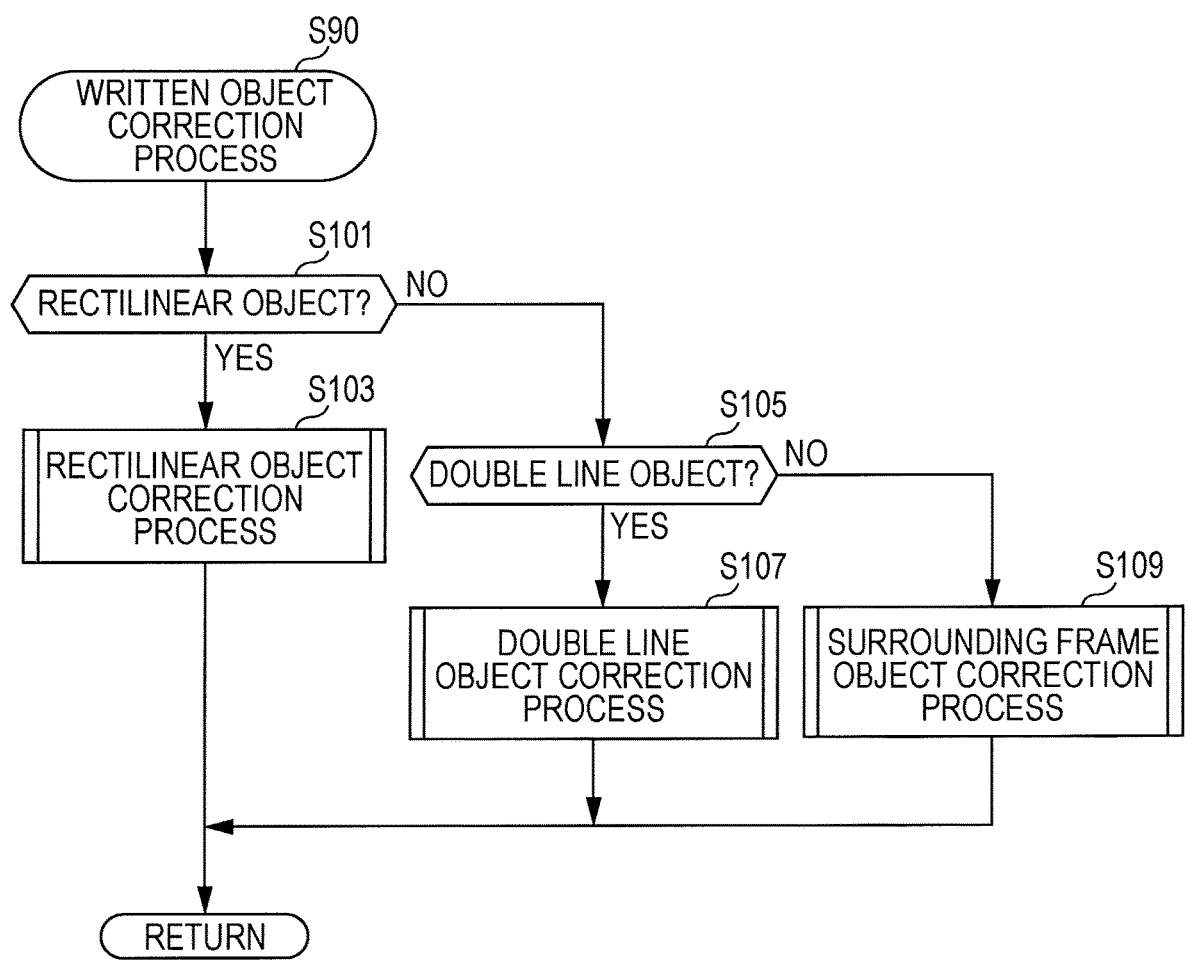
FIG. 17 is a flowchart illustrating an example of a specific processing procedure of a written object correction process.

FIG. 17 is a flowchart illustrating an example of the specific processing procedure of the written object correction process (step S90 in FIG. 16). First, the information processing apparatus 2 determines whether the written object B1 is a rectilinear object B2 on the basis of the determination result in the written object detection process (FIG. 15) (step S101). When the written object B1 is the rectilinear object B2 (step S101: YES), a rectilinear object correction process (step S103) is executed. A specific processing procedure of the rectilinear object correction process (step S103) will be described later.

When it is determined that the written object B1 is not the rectilinear object B2 (step S101: NO), the information processing apparatus 2 further determines whether the written object B1 is a double line object B6 (step S105). When it is determined that the written object B1 is the double line object B6 (step S105: YES), a double line object correction process (step S107) is executed. On the other hand, when it is determined that the written object B1 is not the double line object B6 (step S105: NO), a surrounding frame object correction process (step S109) is executed. Specific processing procedures of the double line object correction process (step S107) and the surrounding frame object correction process (step S109) will be described later. When the rectilinear object correction process (step S103), the double line object correction process (step S107), or the surrounding frame object correction process (step S109) is executed, the written object correction process ends.

Figure 18:
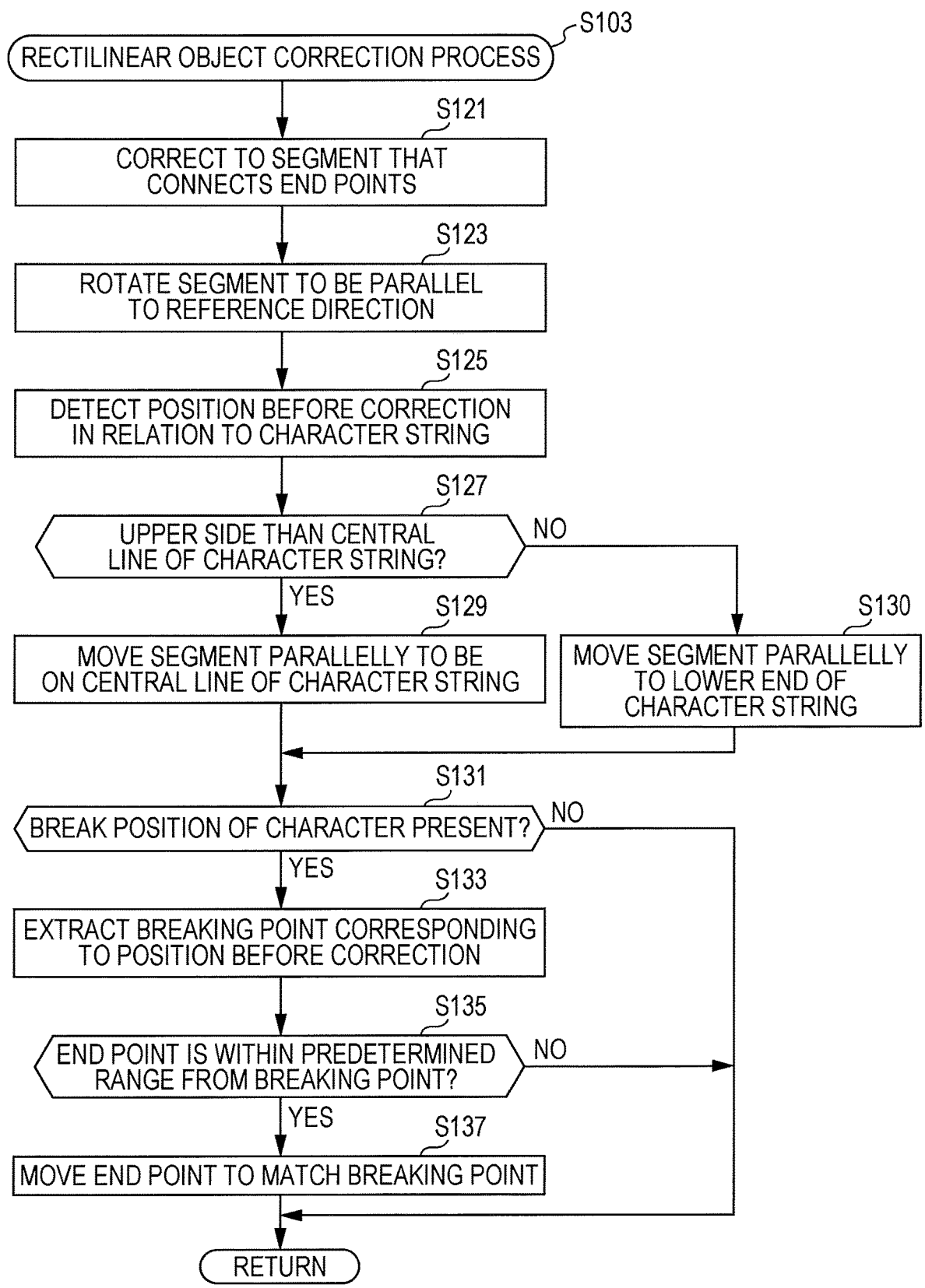
FIG. 18 is a flowchart illustrating an example of a specific processing procedure of a rectilinear object correction process.

FIG. 18 is a flowchart illustrating an example of a specific processing procedure of the rectilinear object correction process (step S103 in FIG. 17). First, the information processing apparatus 2 corrects the rectilinear object B2 to a segment that connects the end points of the rectilinear object B2 (step S121). Subsequently, the rectilinear object B2 corrected to the segment that connects the end points is rotated to be parallel to the reference direction F1 (step S123).

The information processing apparatus 2 detects the position of the rectilinear object B2 before correction in relation to the character string (step S125) and determines whether the rectilinear object B2 before correction is on the upper side than the central line of the character string (step S127). When it is determined that the rectilinear object B2 before correction is on the upper side than the central line of the character string (step S127: YES), the rectilinear object B2 is moved in parallel so as to overlap the central line of the character string (step S129). On the other hand, when it is determined that the rectilinear object B2 is on the lower side than the central line of the character string (step S127: NO), the rectilinear object B2 is moved parallelly to a predetermined position near the lower end of the character string (step S130).

Furthermore, the information processing apparatus 2 determines whether a break position is detected in the character string in the reference detection process (FIG. 14) (step S131). When a break position is detected in the character string (step S131: YES), the information processing apparatus 2 extracts a breaking point corresponding to the position of the rectilinear object B2 before correction (step S133). Moreover, it is determined whether the end point of the rectilinear object B2 is within a predetermined range from the extracted breaking point (step S135). When it is determined that the end point is within the predetermined range (step S135: YES), the end point is moved to match the breaking point (step S137) and the rectilinear object correction process ends. When no break position is detected in the character string in step S131 (step S131: NO), the processes of steps S133 to S137 are skipped and the rectilinear object correction process ends.

Figure 19A:
FIGS. 19A to 19E are diagrams illustrating an example of an aspect of correction when a rectilinear object correction process is performed.
Figure 19B:
Figure 19C:
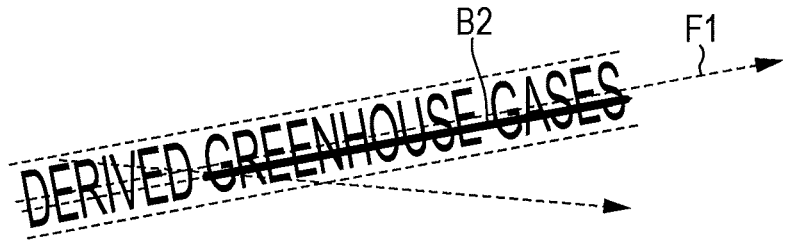

FIGS. 19A to 19E are diagrams illustrating an example of the aspect of correction of the rectilinear object B2 when the rectilinear object correction process (FIG. 18) is executed. As illustrated in FIG. 19A, when the rectilinear object B2 is not a shortest segment that connects the end points, the rectilinear object B2 is corrected to the shortest segment that connects the two end points as illustrated in FIG. 19B. Subsequently, the rectilinear object B2 in the state of being corrected to the segment is rotated about one end point so as to be parallel to the reference direction F1 as illustrated in FIG. 19C, for example.

Figure 19D:
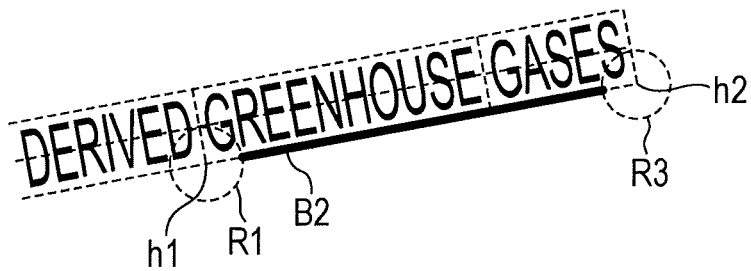

When the rectilinear object B2 is rotated to be parallel to the reference direction F1, the rectilinear object B2 is sometimes displayed so as to overlap the character string. As illustrated in FIG. 19A, the rectilinear object B2 is an underline on the character string since the rectilinear object B2 is added on the lower side than the central line of the character string. Therefore, as illustrated in FIG. 19D, the rectilinear object B2 is moved in a direction vertical to the reference direction F1 so that the rectilinear object B2 is displayed at a predetermined position near the lower end of the character string. In this way, it is understood that the rectilinear object B2 is an underline on the character string.

Figure 19E:

In FIG. 19D, the break position of the character string is detected. Therefore, the breaking points are extracted in the lower end of the character string, and in the example in the drawing, the end points of the rectilinear object B2 are in a region R1 that includes the breaking point h1 and a region R3 that includes the breaking point h2 among the extracted breaking points. Therefore, as illustrated in FIG. 19E, the information processing apparatus 2 moves these end points to match the breaking points h1 and h2. In this way, it is possible to accurately indicate a word to which an underline is added.

Figure 20:
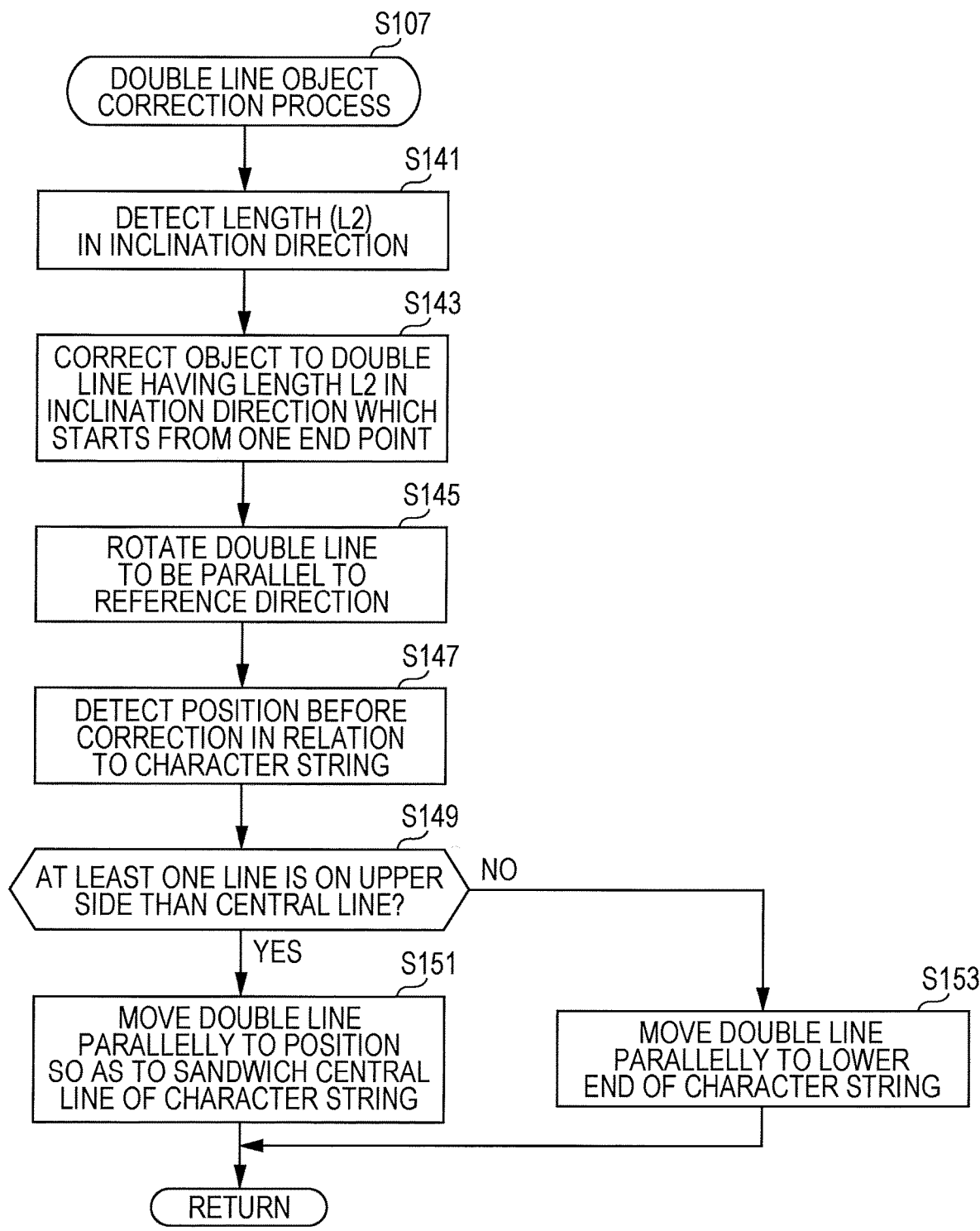
FIG. 20 is a flowchart illustrating an example of a specific processing procedure of a double line object correction process.

FIG. 20 is a flowchart illustrating an example of a specific processing procedure of the double line object correction process (step S107 in FIG. 17). First, the information processing apparatus 2 detects the length L2 of the double line object B6 in the inclination direction F3 (step S141). When the length L2 in the inclination direction F3 is detected, the double line object B6 is corrected to a double line having the length L2 in the inclination direction F3 that starts from one end point (step S143). Two segments that form the double line have a predetermined width set in advance.

Subsequently, the corrected double line object B6 is rotated so as to be parallel to the reference direction F1 (step S145). Moreover, the position of the double line object B6 before correction in relation to the character string is detected (step S147), and it is determined whether at least one line of the double line object B6 before correction is at a position on the upper side than the central line of the character string (step S149). When at least one line is on the upper side than the central line of the character string (step S149: YES), the information processing apparatus 2 moves the double line object B6 parallelly to a position at which the two segments of the double line object B6 sandwiches the central line of the character string (step S151) and ends the double line object correction process. When at least one line is on the upper side than the central line of the character string, since it is considered that the double line object B6 is added by the user as a double strikethrough on a word included in the character string, the process of step S151 is performed. On the other hand, all lines of the double line object B6 is on the lower side of the central line of the character string (step S149: NO), since it is considered that the double line object B6 is added to the character string as a double underline by the user, the information processing apparatus 2 moves the double line object B6 to a predetermined position near the lower end of the character string (step S153) and ends the double line object correction process.

Figure 21A:
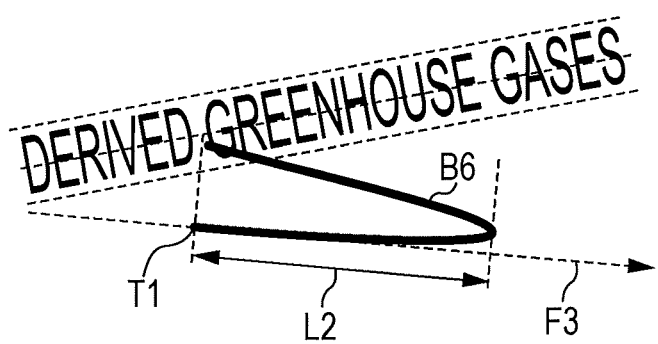
FIGS. 21A to 21D are diagrams illustrating an example of an aspect of correction when a double line object correction process is performed.
Figure 21B:
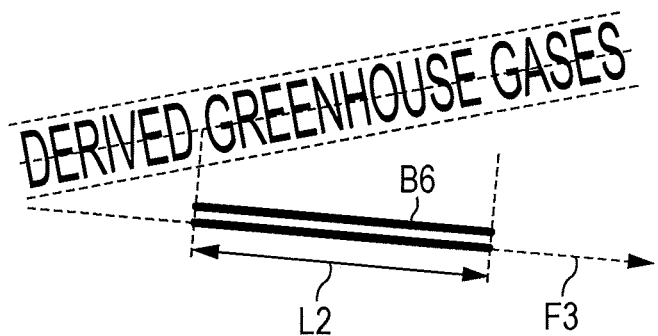

FIGS. 21A to 21D are diagrams illustrating an example of the aspect of correction of the double line object B6 when the double line object correction process (FIG. 20) is performed. As illustrated in FIG. 21A, all lines of the double line object B6 are displayed on the lower side than the central line of the character string. First, the information processing apparatus 2 detects the length L2 of the double line object B6 in the inclination direction F3. Subsequently, when the length L2 is detected, the double line object B6 before correction is corrected to a double line having the length L2 in the inclination direction F3 that starts from the end point T1 as illustrated in FIG. 21B. The segments that form the double line are at a distance set in advance.

Figure 21C:
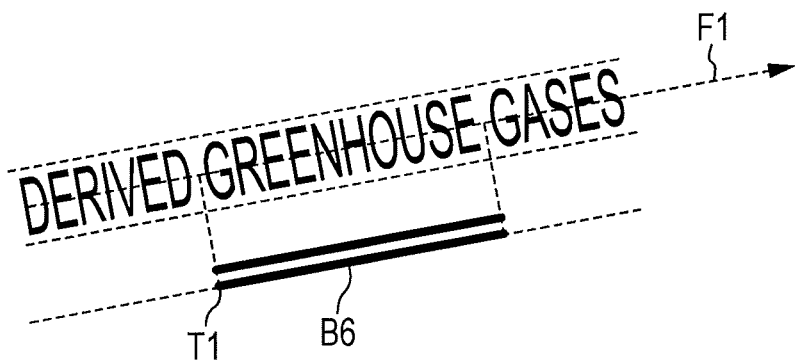
Figure 21D:
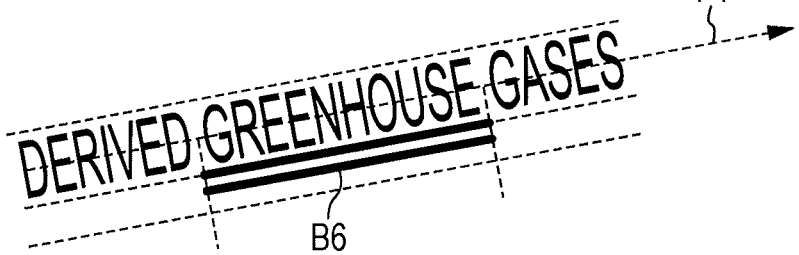

Subsequently, as illustrated in FIG. 21C, the double line object B6 is rotated about the end point T1 so as to be parallel to the reference direction F1, for example. In this way, the double line object B6 is displayed in parallel to the character string. Finally, as illustrated in FIG. 21D, the double line object B6 is moved in the direction vertical to the reference direction F1 so as to be disposed at a predetermined position near the lower end of the character string. In this way, it is understood that the double line object B6 is a double underline on a word included in the character string.

Figure 22:
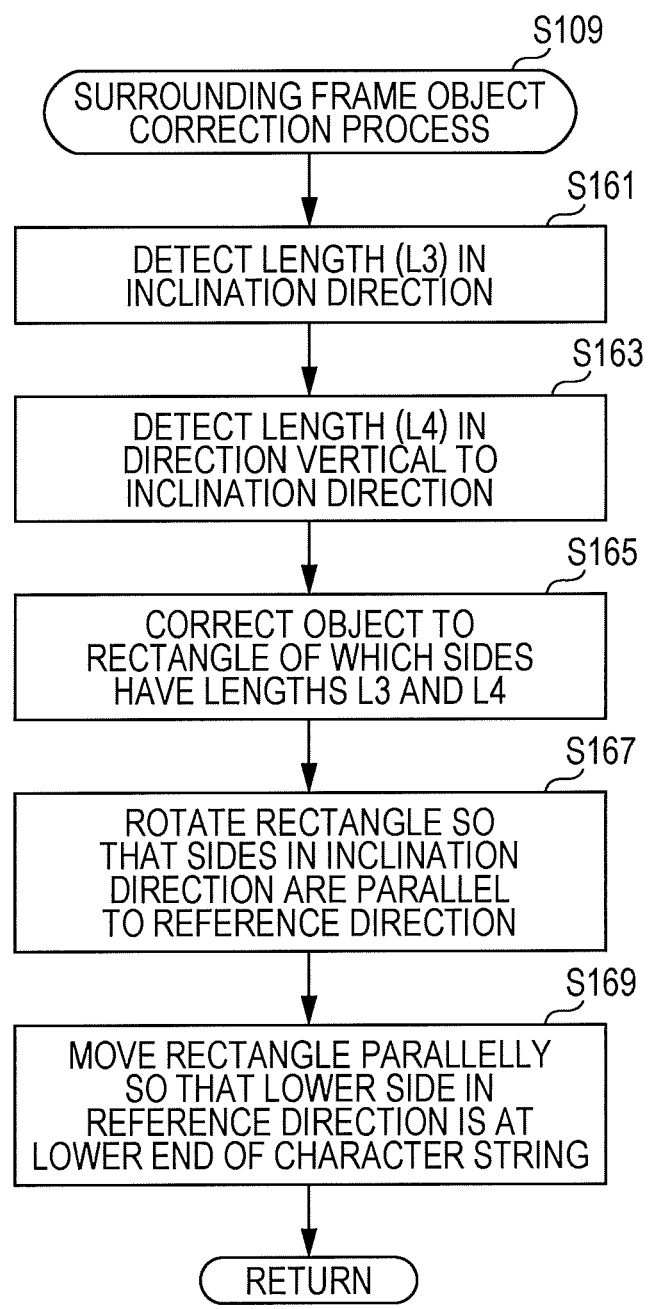
FIG. 22 is a flowchart illustrating an example of a specific processing procedure of a surrounding frame object correction process.

FIG. 22 is a flowchart illustrating an example of a specific processing procedure of the surrounding frame object correction process (step S109 in FIGS. 19A to 19E). The information processing apparatus 2 detects the length L3 of the surrounding frame object B8 in the inclination direction F3 (step S161) and detects the length L4 in the direction vertical to the inclination direction F3 (step S163). When the length L3 in the inclination direction F3 and the length L4 in the direction vertical to the inclination direction F3 are detected, the information processing apparatus 2 corrects the surrounding frame object B8 to a rectangle of which the four sides have the lengths L3 and L4 (step S165).

The information processing apparatus 2 rotates the surrounding frame object B8 so that the sides in the inclination direction F3 among the four sides of the surrounding frame object B8 are parallel to the reference direction F1 (step S167). Finally, the surrounding frame object B8 is moved in the direction vertical to the reference direction F1 so that the side on the lower side among the sides parallel to the reference direction F1 is disposed at a predetermined position near the lower end of the character string (step S169), and the surrounding frame object correction process ends.

Figure 23A:
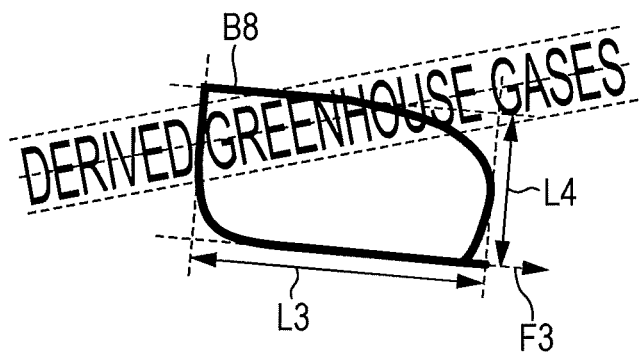
FIGS. 23A to 23D are diagrams illustrating an example of an aspect of correction when a surrounding frame object correction process is performed.
Figure 23B:
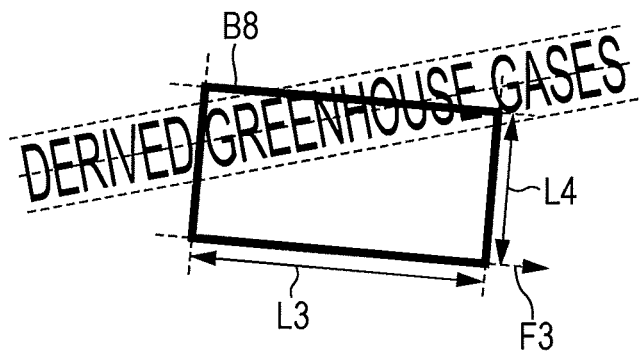

FIGS. 23A to 23D are diagrams illustrating an example of the aspect of correction of the surrounding frame object B8 when the surrounding frame object correction process (FIG. 22) is executed. First, as illustrated in FIG. 23A, the information processing apparatus 2 detects the length L3 of the surrounding frame object B8 in the inclination direction F3 and the length L4 in the direction vertical to the inclination direction F3. The length L3 is the largest width of the surrounding frame object B8 in the inclination direction F3, for example, and the length L4 is the largest height in the direction vertical to the inclination direction F3, for example. When the lengths L3 and L4 are detected, the surrounding frame object B8 before correction is corrected to a rectangle of which the four sides have the lengths L3 and L4, as illustrated in FIG. 23B. Moreover, the sides having the length L3 are parallel to the inclination direction F3 as illustrated in FIG. 23B.

Figure 23C:
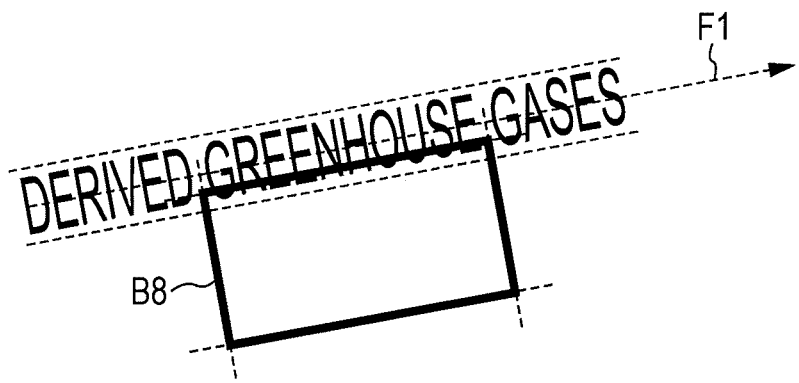
Figure 23D:
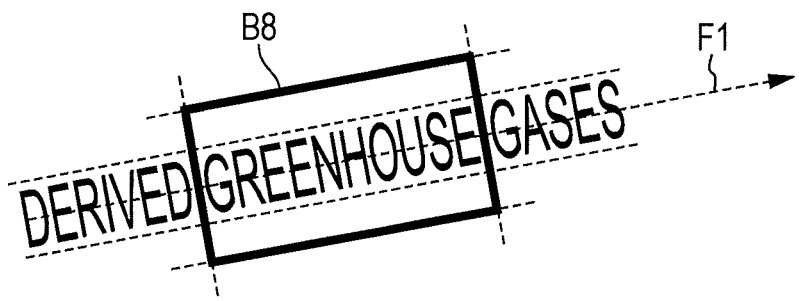

Subsequently, as illustrated in FIG. 23C, the information processing apparatus 2 rotates the corrected surrounding frame object B8 about one apex of the surrounding frame object B8 so that the sides having the length L3 of the surrounding frame object B8 are parallel to the reference direction F1. Finally, the surrounding frame object B8 is moved in the direction vertical to the reference direction F1 so that a side on the lower side in relation to the reference direction F1 among the sides having the length L3 is displayed at a predetermined position near the lower edge of the character string. In this way, it is understood that the surrounding frame object B8 is the written object B1 that surrounds a word included in the character string.

(Modification)

While embodiments of the present invention have been described, the present invention is not limited to the content described in the embodiments but various modifications can be applied.

For example, in the above-described embodiment, a case in which a process of detecting the reference direction F1 is performed when a character string is detected in the image A1 is illustrated. However, the present invention is not limited to this, but the information processing apparatus 2 may perform a process of detecting the reference direction F1 when a ruled line, for example, is detected in the image A1. In this case, the information processing apparatus 2 detects the reference direction F1 on the basis of predetermined setting. For example, the reference direction F1 may be detected on the basis of a ruled line of which the inclination with respect to one edge of the page P1 on which the image A1 is displayed is relatively small.

According to an embodiment of the present invention, it is possible to display an object written to an image or a character displayed on a display unit according to an operation of a user at an appropriate position of the image or the character and to improve the documentation efficiency.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An information processing apparatus capable of displaying an image on a display, comprising:
   a hardware processor configured to:
   receive a trace of a movement of an operation by a user on the display;
   convert the trace to an input on an image that is previously displayed on the display;
   generate a written object according to the input;
   detect a character string included in the image previously displayed on the display;
   detect a reference direction of the image previously displayed on the display on the basis of an arrangement direction of the detected character string;
   detect an inclination direction of the written object added to the image previously displayed on the display;
   determine whether to correct an orientation of the written object based on a difference between an angle of the detected inclination direction and an angle of the reference direction, the angle of the reference direction being an acute angle; and
   when it is determined to correct the orientation of the written object, displaying the written object, with the inclination direction corrected to the reference direction, on the display along with the image previously displayed on the display.

2. The information processing apparatus according to claim 1, wherein
   the hardware processor corrects the inclination direction when the difference between the angle of the detected inclination direction and the angle of the reference direction is within a predetermined range.

3. The information processing apparatus according to claim 2, wherein
   the predetermined range is set in advance by the user.

4. The information processing apparatus according to claim 1, wherein
   the hardware processor does not correct the inclination direction when the difference between the angle of the detected inclination direction and the angle of the reference direction is outside a predetermined range.

5. The information processing apparatus according to claim 1, wherein
   the written object includes a linear object made up of lines which are written-input according to the operation of the user, and
   in a case where the written object is the linear object, the hardware processor corrects the inclination direction when a length of the linear object in the reference direction is equal to or larger than a predetermined value and the difference between the angle of the inclination direction and the angle of the reference direction is within the first range, and the hardware processor corrects the inclination direction when the length of the linear object in the reference direction is smaller than the predetermined value and the difference between the angle of the inclination direction and the angle of the reference direction is within a second range that includes the first range.

6. The information processing apparatus according to claim 1, wherein the hardware processor is further configured to:
determine a type of the written object, wherein
the hardware processor corrects the written object according to the determined type of the written object.

7. The information processing apparatus according to claim 6, wherein
the hardware processor determines whether the written object is a predetermined object added to the character string on the basis of a position of the written object in relation to the character string included in the image, and
the hardware processor arranges the written object at a position set in advance for the character string when the hardware processor determines that the written object is the predetermined object.

8. The information processing apparatus according to claim 1, wherein the hardware processor is further configured to:
analyze the detected character string to detect a predetermined break position in the character string, wherein
the hardware processor aligns the end point so as to match the break position when the end point of the written object is within a predetermined range that includes the break position.

9. The information processing apparatus according to claim 8, wherein
the hardware processor detects a break position of a word in the character string, and
the hardware processor aligns the end point so as to match the break position of the word when the end point of the written object is within a predetermined range that includes the detected break position of the word.

10. The information processing apparatus according to claim 1, wherein
when the written object has two end points, the hardware processor corrects the written object to a segment that connects the two end points.

11. The information processing apparatus according to claim 10, wherein
the hardware processor corrects the written object to the segment when the written object is within a predetermined range that includes the segment that connects the two end points.

12. The information processing apparatus according to claim 1, wherein
the image is disposed in a page that forms a document, the hardware processor is further configured to:
correct the image that includes the detected character string so as to be parallel to one edge of the page.

13. The information processing apparatus according to claim 1, wherein
when an image is included in a document that includes a plurality of pages, the hardware processor detects the reference direction of each page on the basis of the image included in each page.

14. The information processing apparatus according to claim 1, wherein the image is generated by a scan function.

15. A non-transitory recording medium storing a computer readable program executed in a computer of an information processing apparatus capable of displaying an image on a display, the program causing the computer to execute the steps of:
receiving a trace of a movement of an operation by a user on the display;
converting the trace to an input on an image that is previously displayed on the display;
generating a written object according to the input;
detecting a character string included in the image previously displayed on the display;
detecting a reference direction of the image previously displayed on the display on the basis of an arrangement direction of the detected character string;
detecting an inclination direction of the written object added to the image previously displayed on the display;
determining whether to correct an orientation of the written object based on a difference between an angle of the detected inclination direction and an angle of the reference direction, the angle of the reference direction being an acute angle; and
when it is determined to correct the orientation of the written object, displaying the written object, with the inclination direction corrected to the reference direction, on the display along with the image previously displayed on the display.

16. The non-transitory recording medium storing a computer readable program according to claim 15, wherein
in the correcting step, the inclination direction is corrected when the difference between the angle of the detected inclination direction and the angle of the reference direction is within a predetermined range.

17. The non-transitory recording medium storing a computer readable program according to claim 16, wherein
the predetermined range is set in advance by the user.

18. The non-transitory recording medium storing a computer readable program according to claim 15, wherein
in the correcting step, the inclination direction is not corrected when the difference between the angle of the detected inclination direction and the angle of the reference direction is outside a predetermined range.

19. The non-transitory recording medium storing a computer readable program according to claim 15, wherein
the written object includes a linear object made up of lines which are written-input according to the operation of the user, and
in the correcting step, in a case where the written object is the linear object, the inclination direction is corrected when a length of the linear object in the reference direction is equal to or larger than a predetermined value and the difference between the angle of the inclination direction and the angle of the reference direction is within the first range, and the inclination direction is corrected when the length of the linear object in the reference direction is smaller than the predetermined value and the difference between the angle of the inclination direction and the angle of the reference direction is within a second range that includes the first range.

20. The non-transitory recording medium storing a computer readable program according to claim 15, wherein
the program further causes the computer to execute a step of determining a type of the written object, and in the correcting step, the written object is corrected according to the determined type of the written object.

21. The non-transitory recording medium storing a computer readable program according to claim 20, wherein
in the determining step, whether the written object is a predetermined object added to the character string is determined on the basis of a position of the written object in relation to the character string included in the image, and
in the correcting step, the written object is arranged at a position set in advance for the character string when it is determined that the written object is the predetermined object.

22. The non-transitory recording medium storing a computer readable program according to claim 15, wherein
the program further causes the computer to execute a step of analyzing the detected character string to detect a predetermined break position in the character string, and
in the correcting step, the end point is aligned so as to match the break position when the end point of the written object is within a predetermined range that includes the break position.

23. The non-transitory recording medium storing a computer readable program according to claim 22, wherein
in the step of detecting the break position, a break position of a word in the character string is detected, and
in the correcting step, the end point is aligned so as to match the break position of the word when the end point of the written object is within a predetermined range that includes the detected break position of the word.

24. The non-transitory recording medium storing a computer readable program according to claim 15, wherein
in the correcting step, when the written object has two end points, the written object is corrected to a segment that connects the two end points.

25. The non-transitory recording medium storing a computer readable program according to claim 24, wherein
in the correcting step, the written object is corrected to the segment when the written object is within a predetermined range that includes the segment that connects the two end points.

26. The non-transitory recording medium storing a computer readable program according to claim 15, wherein
the image is disposed in a page that forms a document, and
the program further causes the computer to execute a step of correcting the image that includes the detected character string so as to be parallel to one edge of the page.

27. The non-transitory recording medium storing a computer readable program according to claim 15, wherein
in the step of detecting the reference direction, when an image is included in a document that includes a plurality of pages, the reference direction of each page is detected on the basis of the image included in each page.

28. The non-transitory recording medium storing a computer readable program according to claim 15, wherein
the image is generated by a scan function.

* * * * *